(12) United States Patent
Chughtai et al.

(10) Patent No.: US 12,289,799 B2
(45) Date of Patent: Apr. 29, 2025

(54) ESTABLISHING AND MAINTAINING CELLULAR DATA COMMUNICATION USING REMOTE SUBSCRIBER IDENTIFICATION MODULE PROFILE

(71) Applicant: Pismo Labs Technology Limited, Kowloon (HK)

(72) Inventors: Uzair Ahmed Chughtai, Kowloon (HK); Man Kit Kwan, New Territories (HK); Azim Ui Islam, Jashore (BD); Ka Ho Ho, Kowloon (HK); Yee Ting Tse, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 3 days.

(21) Appl. No.: 17/766,702

(22) PCT Filed: Apr. 1, 2021

(86) PCT No.: PCT/IB2021/052734
§ 371 (c)(1),
(2) Date: Apr. 5, 2022

(87) PCT Pub. No.: WO2022/208138
PCT Pub. Date: Oct. 6, 2022

(65) Prior Publication Data
US 2024/0073674 A1     Feb. 29, 2024

(51) Int. Cl.
*H04W 8/20* (2009.01)
*H04W 8/18* (2009.01)
*H04W 12/06* (2021.01)

(52) U.S. Cl.
CPC .......... *H04W 8/205* (2013.01); *H04W 8/183* (2013.01); *H04W 12/06* (2013.01)

(58) Field of Classification Search
CPC ...... H04W 8/205; H04W 8/183; H04W 12/06
See application file for complete search history.

(56) References Cited

U.S. PATENT DOCUMENTS 9,986,446 B2    5/2018   Gonzalez
10,129,724 B2   11/2018  Yu
(Continued)

FOREIGN PATENT DOCUMENTS

CN         105900468 A      8/2016

OTHER PUBLICATIONS

International Search Report in International Application No. PCT/IB2021/052734, mailed on Jan. 6, 2022.
(Continued)

*Primary Examiner* — Steven S Kelley
(74) *Attorney, Agent, or Firm* — Hershkovitz & Associates, PLLC; Abe Hershkovitz

(57) ABSTRACT

The present invention discloses methods and systems for establishing data communication at a network device. The method includes identifying a cellular network by the network device. After that, the network device sends a request to an MSA for an embedded subscriber identification module (eSIM) profile of the cellular network. The MSA may or may not have an eSIM profile of the cellular network available. When an eSIM profile of the cellular network is available, the network device receives the eSIM profile information from the MSA. The network device then sends a request for data communication access to the cellular network using the eSIM profile information to obtain data communication access through the cellular network. The network device may comprise at least one universal integrated circuit card (UICC) and/or embedded universal integrated circuit card (eUICC).

17 Claims, 17 Drawing Sheets

(56) References Cited

U.S. PATENT DOCUMENTS

| | | |
|---|---|---|
| 10,440,593 B2 | 10/2019 | Gonzalez |
| 10,484,894 B2 | 11/2019 | Gonzalez |
| 10,555,172 B2 | 2/2020 | Werdell |
| 2009/0221265 A1* | 9/2009 | Liu .................... H04L 63/0853 |
| | | 455/411 |
| 2014/0199963 A1 | 7/2014 | Mohebbi |
| 2016/0323695 A1 | 11/2016 | Yu |
| 2017/0105239 A1 | 4/2017 | Mohebbi |
| 2017/0171742 A1* | 6/2017 | Yang .................... H04W 8/245 |
| 2017/0347278 A1 | 11/2017 | Gonzalez |
| 2018/0077573 A1 | 3/2018 | Werdell |
| 2018/0109942 A1* | 4/2018 | Lipovkov ............ H04B 1/3816 |
| 2018/0242173 A1 | 8/2018 | Gonzalez |
| 2019/0028883 A1* | 1/2019 | Namiranian .......... H04W 8/183 |
| 2019/0274057 A1 | 9/2019 | Gonzalez |
| 2020/0178070 A1 | 6/2020 | Yang |
| 2024/0147219 A1* | 5/2024 | Chaugule .............. H04W 12/06 |

OTHER PUBLICATIONS

Written Opinion of the International Search Authority in International Application No. PCT/IB2021/052734, mailed on Jan. 6, 2022.
English Language Abstract of CN105900468A (Aug. 24, 2016).

* cited by examiner

| MNO ID (PLMN ID) | ICCID | eUICC ID | Status |
|---|---|---|---|
| 001 | aaa | 111111 | "In use" |
|  | bbb | 222222 | "Available" |
|  | ccc | 333333 | "Available" |
| 002 | ppp | 111111 | "In use" |
|  | qqq | 333333 | "Available" |
| 003 | sss | 1111111 | "Available" |

FIG. 9

ESTABLISHING AND MAINTAINING CELLULAR DATA COMMUNICATION USING REMOTE SUBSCRIBER IDENTIFICATION MODULE PROFILE

TECHNICAL FIELD

The present invention generally relates to the field of cellular communication, and more particularly, to methods and systems for using embedded subscriber identification module (eSIM) technology to establish cellular network connections at a network device through a plurality of wireless communication modules (WCMs).

BACKGROUND ART

The use of embedded Universal Integrated Circuit Cards (eUICCs), also referred to as eSIMs, is becoming increasingly prevalent in consumer and machine-to-machine (M2M) network devices. For example, the M2M devices may include cellular routers, hubs, servers, Internet of Things (IoT) devices, etc., and the consumer devices may include smartphones, tablet computers, smartwatches, and gaming consoles. Unlike a traditional UICC, generally known as a removable subscriber identification module (SIM) or SIM card, that is transferable between multiple devices, an eUICC is not designed to be removable, i.e., it is embedded with or soldered to an electronic circuit board of a device. An eUICC may be provisioned with one or more eSIM profiles. Each eSIM profile may comprise a unique international mobile subscriber identity (IMSI) number that authenticates a subscriber to a mobile network operator (MNO).

In case of removable SIM cards, switching between MNOs may be realized by removing a SIM card then inserting another SIM card from a desired MNO. When a user is visiting a geographical area other than the user's home geographical area, the user may prefer to switch to a local MNO of the visited geographical area in order to avoid roaming charges. The term "home geographical area" is used to refer to a geographical area where a user/subscriber has their wireless service account. The term "visited geographical area" is used to refer to a geographical area other than a user's/subscriber's home geographical area to which the user or subscriber is roaming.

In such instances, obtaining a SIM card from a local MNO of the visited geographical area may be troublesome, as the user may need to visit a point of sales (POS) and go through user validation and authentication processes by providing nationality information, user-specific information, and other required information. Since the user is in a visiting geographical area, getting through these validation processes may be difficult, and the user might not be allowed to obtain a SIM card. This problem is solved by state of the art techniques, such as virtual SIM technology, remote SIM technique, and so forth. In virtual SIM technology, the user may be provided with a virtual SIM from a local MNO of the visited geographical area where the MNO checks the user's information for validity by communicating with an MNO of the user's home geographical area to which the user is subscribed.

In remote SIM technique, one or more SIM storage devices, such as MSAs are used to store a massive number of SIM cards from MNOs of different geographical areas. Thus, when a user wants to access a cellular network provided by a local MNO of a visited geographical area, the user device (e.g., a network device) is provided with the SIM information of a local MNO of the visited geographical area by the MSA to use the data communication services of the MNO. However, this system may have some drawbacks; as for storing every SIM card, a SIM slot and its backend circuitries are needed. Therefore, the more the numbers of SIM cards are stored, the bigger the size of the MSA becomes, and thereby the associated costs may increase. As such, it would be desirable to implement eSIM technology with MSAs. However, using eSIMs in MSAs may require methods and systems for downloading eSIM profiles, managing eSIM profiles in the MSAs, managing the MSAs, and utilizing the eSIM profiles by one or more network devices.

DISCLOSURE OF THE INVENTION

Summary

One exemplary embodiment of the present invention discloses a method and system for establishing data communication at a network device using eSIM profile(s). The method includes identifying a cellular network by the network device. After that, the network device sends a request to an MSA for an eSIM profile of the cellular network. The MSA may or may not have an eSIM profile of the cellular network available. When the MSA has an eSIM profile of the cellular network available, the MSA sends all or part of the eSIM profile information to the network device. The network device receives the eSIM profile information from the MSA. The network device then sends a request for data communication access to the cellular network using the eSIM profile information. When the request is accepted, the network device obtains data communication access through the cellular network. The network device comprises at least one SIM interface configurable to connect to at least one removable SIM. The network device may also comprise one or more eUICCs.

In one exemplary aspect, the method further includes receiving an authentication request at the network device from the cellular network after sending the request for data communication access. The network device then forwards the authentication request to the MSA. The method further includes receiving authentication information from the MSA in response to the authentication request. The authentication information is provided to the MSA by an eUICC storing the eSIM profile. The eUICC may be housed in the MSA. The network device then forwards the authentication information to the cellular network.

In one exemplary aspect, the all or part of information of the eSIM profile received comprises an international mobile subscriber identity (IMSI). In another exemplary aspect, the identification of the cellular network is achieved by performing a scan using an available WCM placed in the network device. In another exemplary aspect, the WCM is not capable of downloading eSIM profiles.

In another exemplary aspect, the method further includes receiving a negative response from the MSA when an eSIM profile of the cellular network is not determined as available at the MSA. In another exemplary aspect, the MSA houses a plurality of eUICCs. Each of the plurality of eUICCs is capable of storing a plurality of eSIM profiles. In another exemplary aspect, identities of the plurality of eUICCs are recorded in an eSIM profile lookup table stored in a storage unit of the MSA.

In another exemplary embodiment of the present invention, a method, and a corresponding system, is disclosed for establishing data communication at a network device. The method includes identifying one or more available cellular networks by the network device. The network device then selects a first group of cellular networks from the one or more cellular networks identified. After that, the network device sends a request, to an MSA, for an inquiry of the availability of eSIM profile of the cellular network(s) in the first group of cellular networks. The request for the inquiry comprises the identity of cellular network(s) in the first group of cellular networks. When at least one eSIM profile of the first group of cellular networks is available at the MSA, the network device receives information of a second group of cellular networks from the MSA. After that, the network device selects at least one cellular network from the second group of cellular networks based on at least one condition. The network device then sends a request for data communication access to the selected at least one cellular network. The network device obtains data communication access if the request for data communication access is accepted by the selected at least one cellular network.

In one exemplary aspect, the method further includes receiving, at the network device, a request for subscriber identity information from the selected at least one cellular network after sending the request of data communication access to the selected at least one cellular network. The network device then forwards the request for subscriber identity information to the MSA. After that, the network device receives subscriber identity information from the MSA responsive to the request for subscriber identity information. The network device then forwards the subscriber identity information to the selected at least one cellular network. After that, the network device receives an authentication request from the selected at least one cellular network. The network device forwards the authentication request to the MSA. The network device then receives authentication information from the MSA in response to the request for authentication information. The MSA receives the authentication information from at least one eUICC storing at least one eSIM profile of the selected at least one cellular network. The network device then forwards the authentication information to the selected at least one cellular network.

In one exemplary aspect, the method further includes receiving a negative response from the MSA when at least one eSIM profile of the first group of cellular networks is not available at the MSA. In one exemplary aspect, the method further includes sending a notification comprising the negative response to an administrator when the negative response is received.

In another exemplary aspect, the first and the second group of cellular networks may comprise one or more cellular networks. In another exemplary aspect, the method further includes when the second group of cellular networks comprises one cellular network, selecting the cellular network and not applying the at least one condition. In one exemplary aspect, the second group of cellular networks include the identity of cellular network(s) for which eSIM profile is available at the MSA.

In one exemplary aspect, the at least one condition is based on a threshold signal strength level. In another exemplary aspect, the at least one condition is further based on one or more of: tariff cost, network performance, network types, administrator's preference, and/or service quality of a cellular network. In one exemplary aspect, the identification of the one or more cellular networks is achieved by performing a scan at the network device in its current geographical area using an available WCM placed in the network device. In one exemplary aspect, the at least one eUICC is placed in the MSA. In one exemplary aspect, the subscriber identity information comprises at least one international mobile subscriber identity (IMSI) of at least one available eSIM profile of the selected at least one cellular network when the request for subscriber identity information is a request for IMSI.

In yet another exemplary embodiment of the present invention, a method, and corresponding system, is disclosed for downloading eSIM profile at an MSA. The method includes receiving a request to initiate eSIM profile downloading at the MSA. The method also includes selecting an eUICC from a plurality of eUICCs. The MSA then retrieves an eUICC ID information of the selected eUICC. After that, the MSA sends a request for eSIM profile downloading to a network device. The network device then downloads at least one eSIM profile from at least one available cellular network in its geographical area and sends the at least one eSIM profile to the MSA. After that, the MSA receives information of the at least one eSIM profile from the network device. The method also includes installing the at least one eSIM profile onto the selected eUICC.

In one exemplary aspect, the request for eSIM profile downloading comprises the eUICC ID information of the selected eUICC and other associated information that may be required by an MNO to provide an eSIM profile. In one exemplary aspect, the eUICC ID information comprises a unique identification number to identify the selected eUICC. In one exemplary aspect, the plurality of eUICCs is placed in the MSA. In one exemplary aspect, the MSA is remotely located from the network device.

In one exemplary aspect, the request to initiate eSIM profile downloading is received from an MSA management server. The MSA management server is connected to the MSA using an interconnected network. In another exemplary aspect, the request to initiate eSIM profile downloading is received from an administrator or a user.

BRIEF DESCRIPTION OF THE DRAWINGS

Features of the present invention will become apparent to those skilled in the art from the following description with reference to the drawings. The drawings depict only exemplary embodiments of the present invention and are not to be considered limiting in scope; the present invention will be described in more detail in the following description. The use of the same reference numbers in different figures indicates similar or identical items.

FIG. 9 is illustrating an exemplary eSIM profile lookup table according to one exemplary embodiment of the present inventions.

DETAILED DESCRIPTION

Figure 1A:
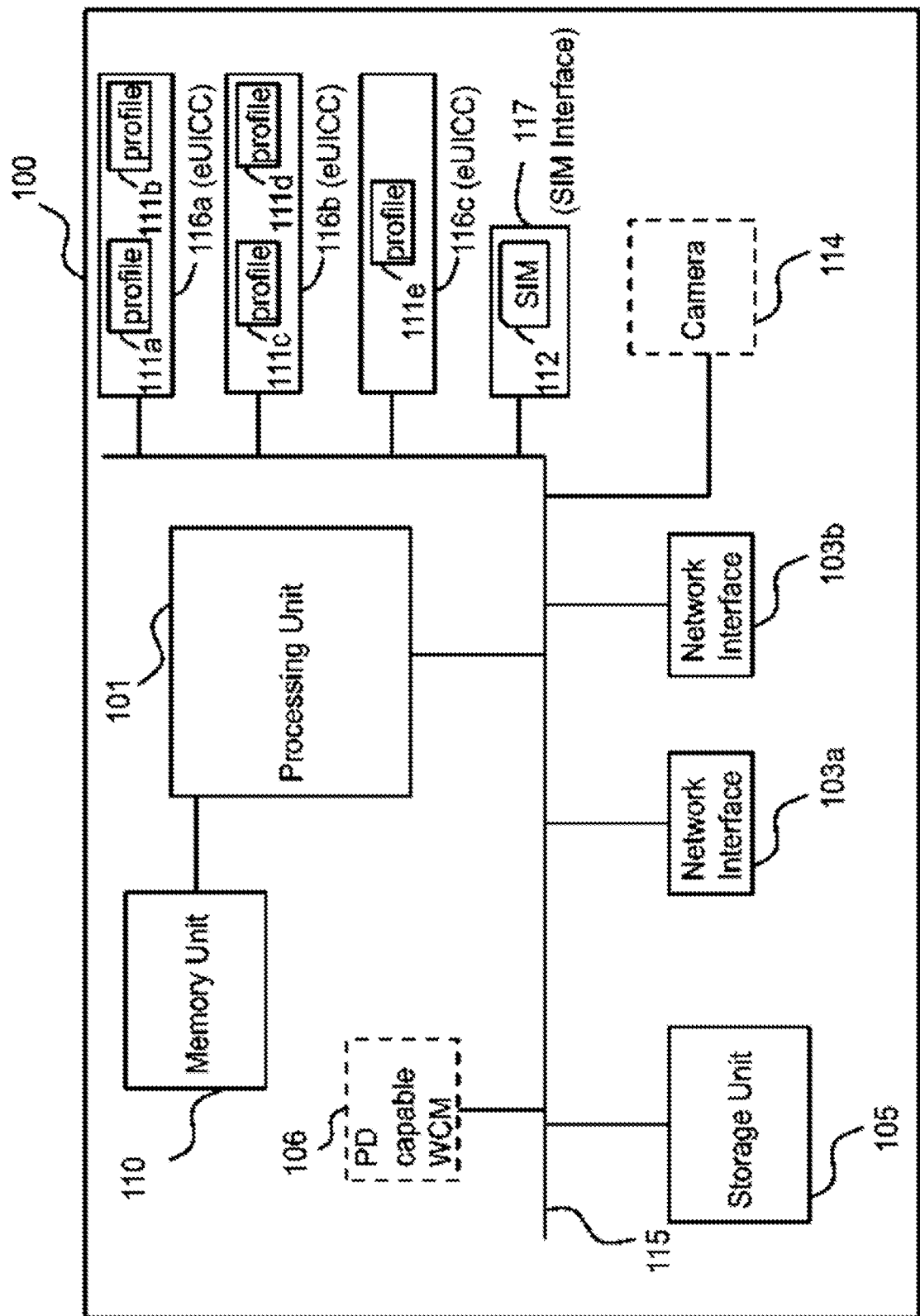
FIG. 1A is a schematic block diagram illustrating the hardware blocks of an exemplary MSA.

In the ensuing description, numerous specific details are set forth for illustration purposes in order to provide a thorough understanding of the present invention. However, it will be apparent that the present invention may be practiced without these specific details. The following description is, therefore, not to be taken for limiting the scope of the present invention. In some exemplary scenarios, well-known structures and devices are shown in block diagram form in order to avoid unnecessarily obscuring the present invention.

An MNO, for the purposes of this specification, is a service provider of a cellular network that owns or controls, or both, the cellular network and all necessary elements including backhaul infrastructure, billing, customer care, provisioning computer systems to provide wireless voice and data communication services for its subscribed mobile users. An MNO is also known as a wireless service provider, wireless carrier, cellular company, cellular network service provider, or mobile network carrier.

A cellular network operated by an MNO may be implemented using multiple radio access networks connected to a core network. Each regional portion of the cellular network may include a number of base stations, also referred to as network cells. The MNO may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and 5th Generation (5G).

The core network of a cellular network may be connected with one or more backend servers that provide backend services. The backend services may include business support systems (BSS) and/or embedded subscriber identification module (eSIM) subscription management server (e.g., SM-DP+). In some exemplary embodiments, the eSIM subscription management server may also be referred to as a profile provisioning server. For example, the services provided by the BSS may include product management, order management, revenue management, and customer management. The services provided by SM-DP+ may include the creation of eSIM profiles in response to valid eSIM profile requests and providing eSIM profiles securely to user devices for loading onto the eUICCs.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware, or microcode, the program instructions to perform the necessary tasks may be stored in a computer-readable storage medium.

A processing unit, such as processing units 101, 155, and 181, may be a complex programmable logic device (CPLD), a field-programmable gate array (FPGA), a central processing unit (CPU), a microprocessor, a microcontroller, a digital signal processor (DSP), any combination of those devices, or any other circuitry configurable to execute the program instructions for implementing the embodiments disclosed herein.

A system bus may carry signals between a master component (e.g., a processing unit) and peripheral components, or among the peripheral components. A system bus may include a plurality of signal lines connecting the components inside or outside of a device. A system bus disclosed herein may be realized using any of several types of bus structures, including a memory bus, a peripheral bus, or a local bus using any of a variety of bus architecture.

FIG. 1A is a schematic block diagram illustrating the hardware blocks of an exemplary MSA, such as MSA 100. MSA 100 comprises a plurality of eUICCs 116. The eUICCs may be affixed with MSA 100 and not removable. It is generally known that an eUICC may be used to store and utilize a plurality of SIM profiles (i.e., eSIM profiles). For example, eUICC 116a may be used to store eSIM profiles 111a-b, eUICC 116b may be used to store eSIM profiles 111c-d, and eUICC 116c may be used to store eSIM profile 111e.

An eSIM profile contains all the necessary information for dialing into a cellular network to enable a corresponding device to obtain telecommunication services from the MNO of the cellular network. For example, each eSIM profile may contain information such as a unique International Mobile Subscriber Identity (IMSI) number that authenticates a subscriber to a cellular network, an Integrated Circuit Card Identifier (ICCID), a Mobile Station International Subscriber Directory Number (MSISDN), cellular network-specific data, and security authentication information. An eSIM profile may be used to perform the same functions as a removable SIM or SIM card. An eSIM profile may also be referred to as an electronic SIM.

MSA 100 may further comprise one or more SIM interfaces. A SIM interface is capable of connecting to a removable SIM. For illustration purposes, one exemplary SIM interface is SIM interface 117, and one exemplary removable SIM is removable SIM 112. A removable SIM may be a Universal Integrated Circuit Card (UICC). SIM interface 117 may be connected to a SIM slot for placing or holding the removable SIM.

Optionally, MSA 100 may also comprise at least one WCM, such as WCM 106. In some exemplary embodiment, when an MSA is to be used for downloading eSIM profiles according to the method (discussed later) in FIG. 3, the MSA should comprise a WCM. However, in some exemplary embodiments, when an MSA is to be used for downloading eSIM profiles according to the methods (discussed later) in FIG. 7, 8a or 8b, the MSA may not need to comprise a WCM. WCM 106 is configurable to use any one of the eSIM profiles or the removable SIMs at a time to access a cellular network. However, for reducing design complexity, it is preferred that WCM 106 uses one or more dedicated removable SIMs or eSIM profiles. WCM 106 may be a profile download (PD) capable WCM. A profile download capable WCM is a WCM that is capable of downloading eSIM profiles.

In some exemplary scenarios, an MSA may comprise a plurality of WCMs, where at least one of the plurality of WCMs is a profile download capable WCM and the other WCMs may be profile download incapable WCMs. A profile download incapable WCM is a WCM that is not capable of downloading eSIM profiles. A WCM, such as WCM 106, may be connected to embedded/external antennas to perform the transmission and reception of radio signals via the antennas. In one variant, WCM 106 is removable, so it is attached to MSA 100 in a way that it may be flexibly removed and attached again.

A processing unit of MSA 100, such as processing unit 101, may be connected to SIM interface 117, eUICCs 116, WCM 106, and other hardware components, such as network interfaces 103a and 103b using a system bus, such as system bus 115. However, in some exemplary scenarios, processing unit 101 may be directly connected to some of the peripheral hardware components, such as one or more of, a SIM interface, an eUICC, a WCM, and/or a storage unit when processing unit 101 has adequate pins; hence, a system bus may not be used. Processing unit 101 may be directly connected to main memory unit 110 and system bus 115. Processing unit 101 may execute program instructions or code segments stored in main memory unit 110 for implementing an exemplary embodiment of the present invention.

MSA 100 may also, optionally, comprise a camera module, such as camera module 114. According to some exemplary embodiments, when an MSA is used to read machine-readable codes using a code reading application stored in a storage unit of the MSA, a camera module may be used to scan the machine-readable codes. An MSA may be used to read machine-readable codes in order to activate eSIM profile downloading. There is no limitation on hardware components that may be connected to the processing unit of MSA 100.

Figure 1B:
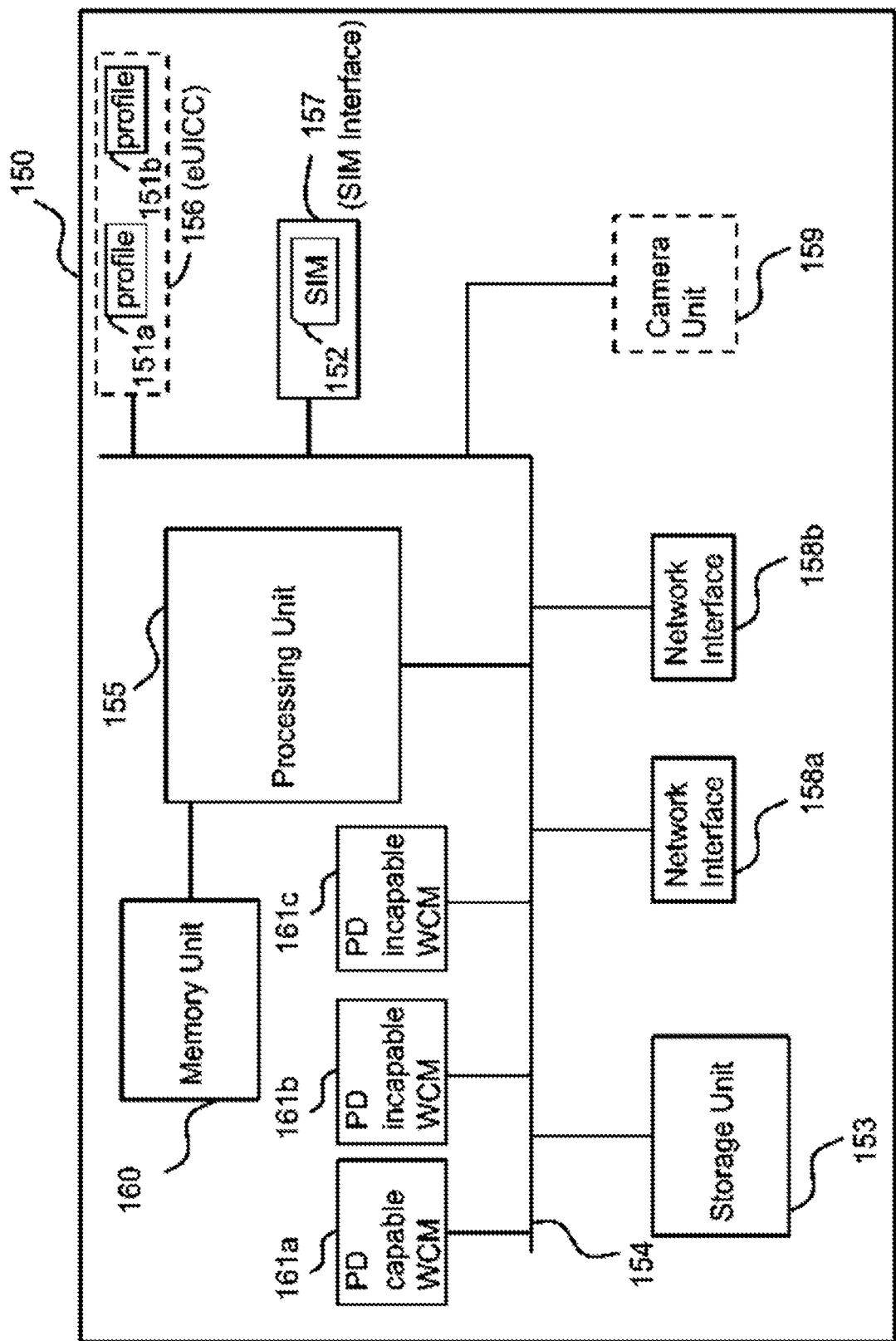
FIG. 1B is a schematic block diagram illustrating the hardware blocks of an exemplary network device.

FIG. 1B is a schematic block diagram illustrating the hardware blocks of an exemplary network device, such as network device 150, in accordance with some exemplary embodiments of the present invention. Network device 150 may comprise at least one SIM interface, such as SIM interface 157, that is capable of connecting at least one removable SIM, such as removable SIM 152. Optionally, network device 150 may also comprise at least one eUICC, such as eUICC 156, that is capable of storing a plurality of eSIM profiles, such as eSIM profiles 151a and 151b.

Network device 150 may also comprise a plurality of WCMs, such as WCMs 161. WCMs 161 may include at least one profile download capable WCM, such as WCM 161a, and the rest of the WCMs may be profile download incapable WCMs, such as WCMs 161b and 161c. The profile download incapable WCMs may be used to establish cellular network connections using removable SIMs or eSIM profiles.

One of the objectives of using profile download incapable WCMs in a network device is to reduce the number of profile download capable WCMs for lowering its manufacturing cost as profile download incapable WCMs are comparatively cheaper than profile download capable WCMs. This reduction in network devices' manufacturing cost may also lead to a reduced cost in M2M network infrastructure implementation using such network devices. Another benefit of using profile download incapable WCMs may be that hardware change requirements can be reduced in legacy network infrastructures when updating these network infrastructures for using the latest technology, such as eSIM technology, as in legacy network infrastructures, the network devices used mostly comprise of profile download incapable WCMs.

As shown in FIG. 1B, network device 150 may comprise a processing unit, such as processing unit 155, to execute program instructions or code segments stored in a memory unit, such as memory unit 160, or in a storage unit, such as storage unit 153. For illustration purposes, memory unit 160 is directly connected to processing unit 155. Memory unit 160 may also be connected to processing unit 155 through a system bus, such as system bus 154. System bus 154 may also be used to connect processing unit 155 with other peripheral hardware components, such as WCMs 161a, 161b, and 161c, network interfaces 158a and 158b, storage unit 153, eUICC 156, and SIM interface 157. Optionally, processing unit 155 may also be connected to a camera module, such as camera 159, which may be used to scan machine-readable codes. In one variant, the aforementioned peripheral hardware components may also be connected to processing unit 155 directly when processing unit 155 has sufficient pins to connect these components, hence, a system bus may not be used.

Figure 1C:
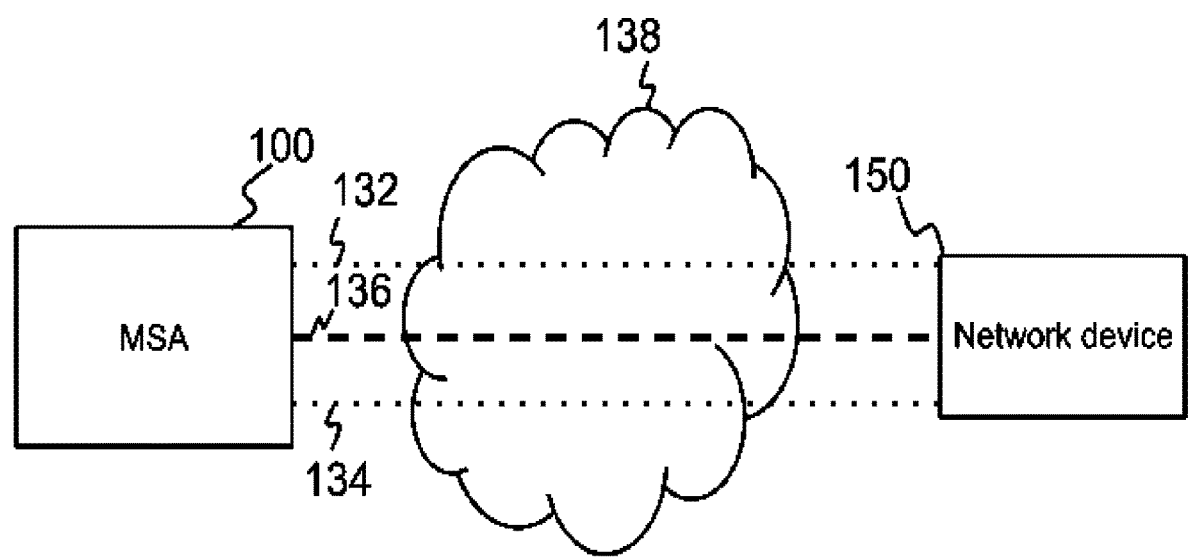
FIG. 1C illustrates exemplary network connection(s) established between an MSA and a network device.

FIG. 1C illustrates exemplary network connection(s) established between MSA 100 and network device 150 according to some exemplary embodiments of the present invention. For example, MSA 100 and network device 150 may be connected via network connection 132 or 134 established through interconnected networks, such as interconnected networks 138. Interconnected networks 138 may represent public interconnected networks, such as the Internet, private interconnected networks, or a hybrid of public and private interconnected networks. In some exemplary embodiments, the term "interconnected network" and "Internet" may be used interchangeably. Network connections 132 and 134, for example, may be established using IP networks using TCP/UDP protocol over wired and/or wireless networks which enables MSA 100 and network device 150 to connect over interconnected networks 138. In one variant, network connections 132 and 134 may be aggregated together to form an aggregated connection, such as aggregated connection 136. There is no limitation on the number of network connections that may be used in an aggregated connection. Further, there is no limitation on the number of network connections that may be established between MSA 100 and network device 150. There is also no limitation to the locations of MSA 100 and network device 150. MSA 100 and network device 150 may be in different geographical areas.

As shown in FIG. 1A, MSA 100 may optionally comprise a WCM, such as WCM 106, and as shown in FIG. 1B, network device 150 may comprise a plurality of WCMs, such as WCMs 161. The plurality of WCMs 161 may include a plurality of profile download incapable WCMs, such as WCMs 161b and 161c, and at least one profile download capable, such as WCM 161a. In one scenario, when MSA 100 is not comprising a WCM or, in another scenario, comprising a WCM, however, still unable to download eSIM profiles from a geographical area where network device 150 is visiting, a profile download capable WCM from network device 150 may be used.

Figure 7:
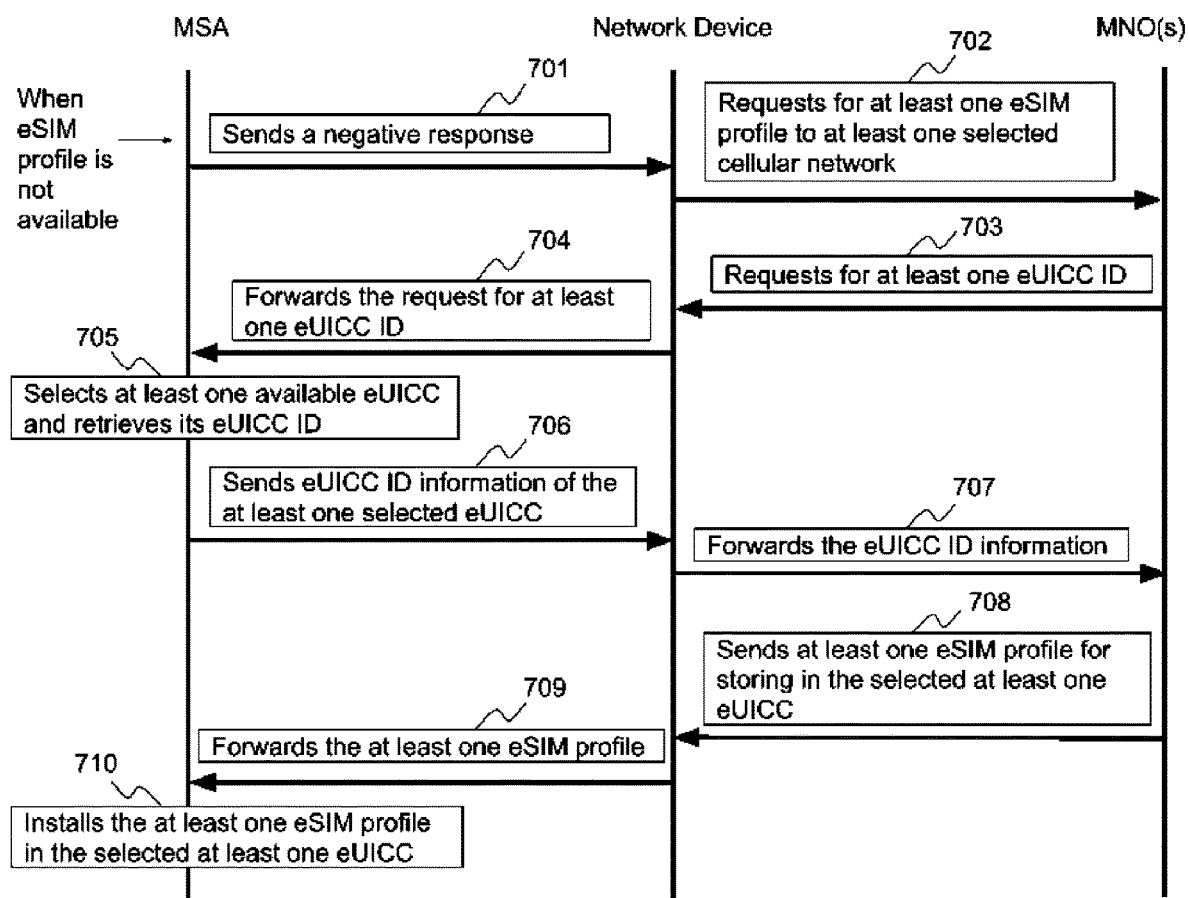
FIG. 7 is a process flow diagram illustrating a method for downloading at least one eSIM profile in an MSA according to one exemplary embodiment of the present invention.
Figure 8A:
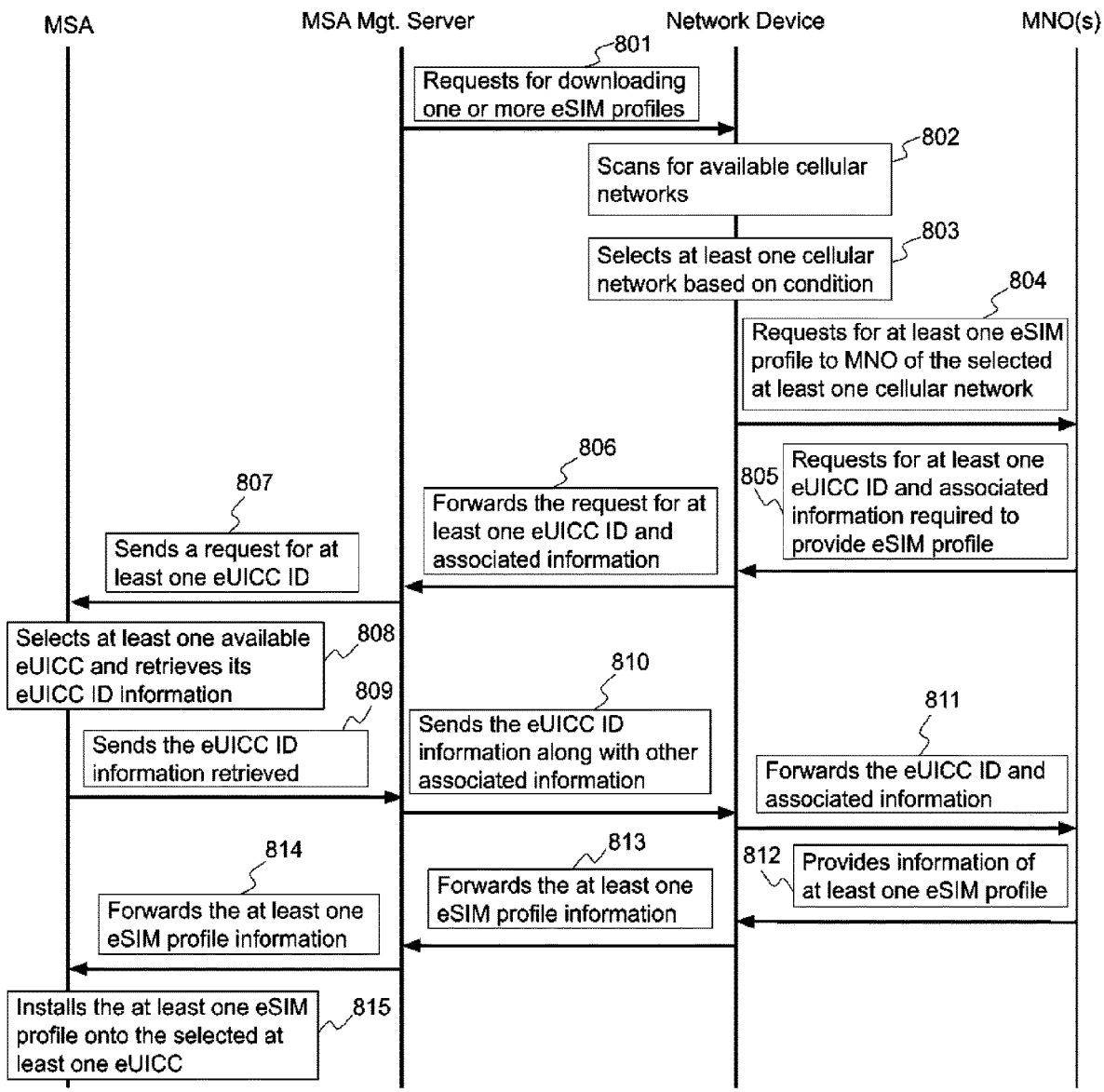
FIG. 8A is a process flow diagram illustrating exemplary communications among an MSA, an MSA management server, a network device, and an MNO when downloading eSIM profile(s) onto one or more eUICCs placed in the MSA.
Figure 8B:
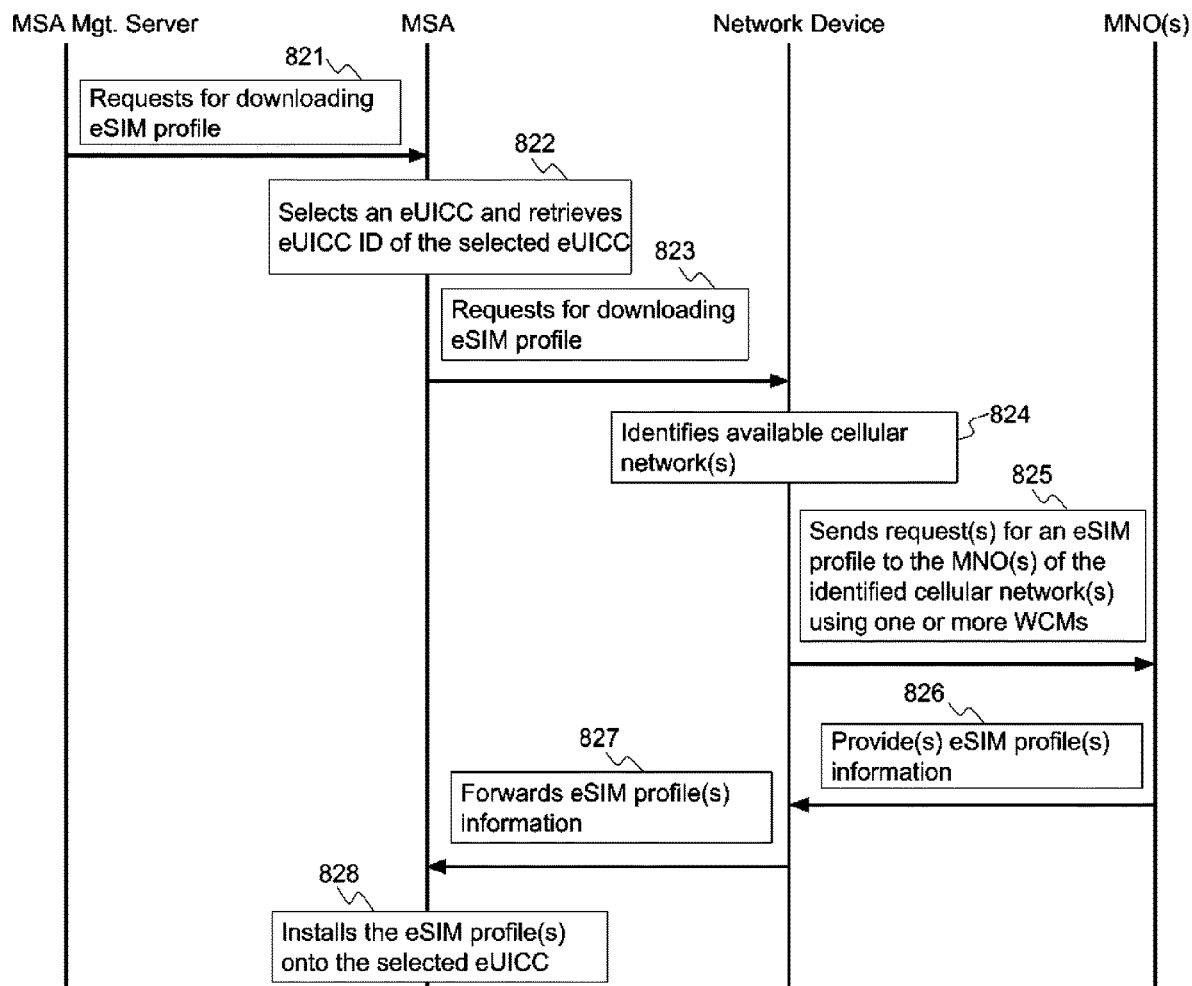
FIG. 8B is a process flow diagram illustrating a method for downloading eSIM profile(s) in an MSA according to one exemplary embodiment of the present invention.

A more detailed disclosure of how eSIM profiles from the local cellular networks of a visited geographical area of a network device may be downloaded in an MSA using the network device, is illustrated in FIGS. 7, 8a, and 8b, according to some exemplary embodiments. One of the objectives for downloading eSIM profiles (in an MSA) from the local cellular networks of a visited geographical area of a network device may be to use the eSIM profiles by the network device to establish cellular network connection(s) and thereby enjoying local charges in a visited geographical area.

Figure 1D:
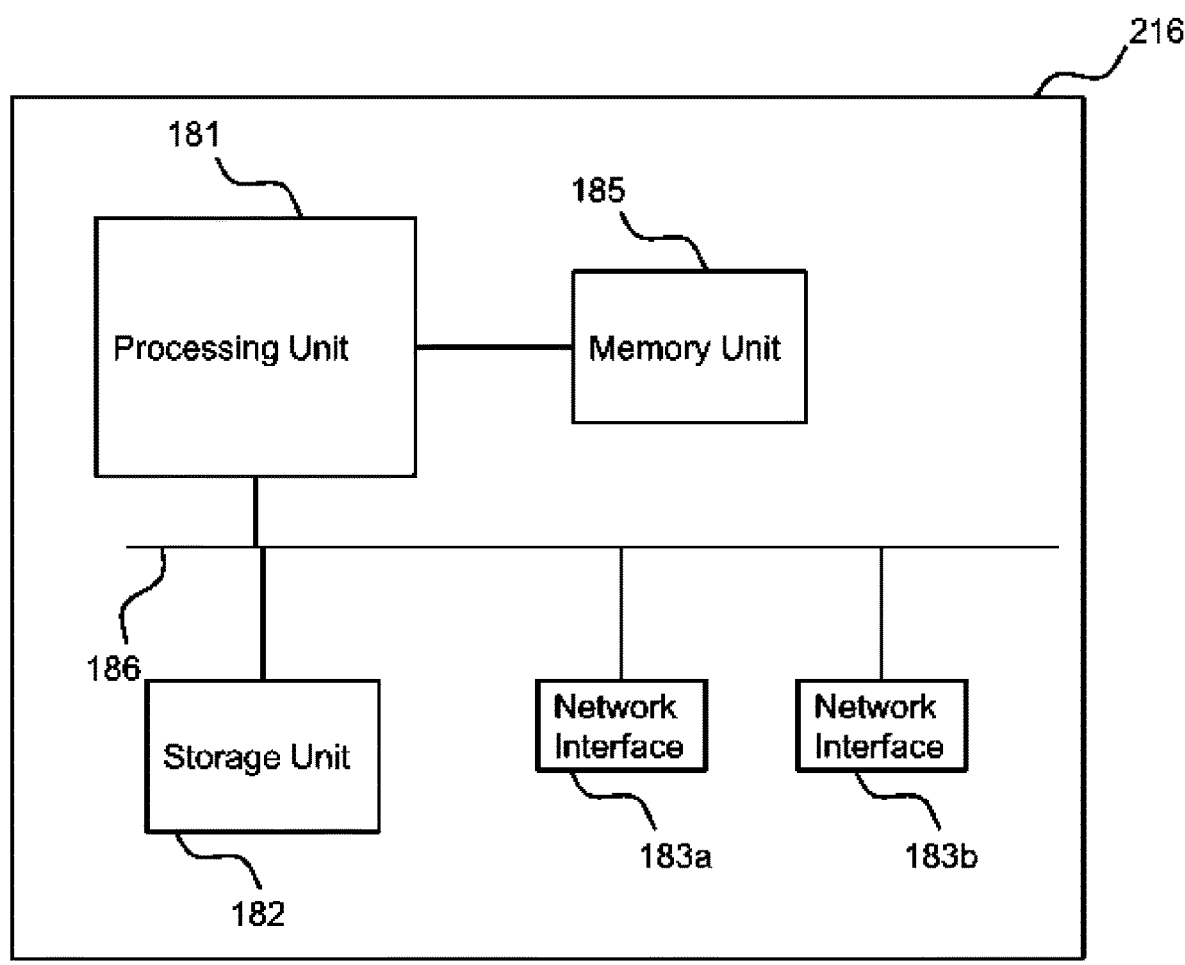
FIG. 1D is a schematic block diagram of an exemplary MSA management server.

FIG. 1D is a schematic block diagram of an exemplary MSA management server, such as MSA management server 216. MSA management server 216 comprises at least one processing unit 181 and at least one main memory unit 185. Processing unit 181 may be directly connected with memory unit 185. MSA management server 216 may further comprise at least one secondary storage unit 182 and a plurality of network interfaces 183a and 183b. Secondary storage unit 182 and network interfaces 183a and 183b may be connected with processing unit 181 directly or through a system bus, such as system bus 186.

Optionally, processing unit 181 of MSA management server 216 is also capable of being connected with other internal or external hardware devices that are not shown in FIG. 1D in order to avoid obscuring the description. The other internal or external hardware devices may include one or more input devices, one or more output devices, a camera module, one or more SIM interfaces, and/or one or more sensors, such as a heat sensor, a location sensor, a touch sensor and/or a motion sensor.

Figure 2A:
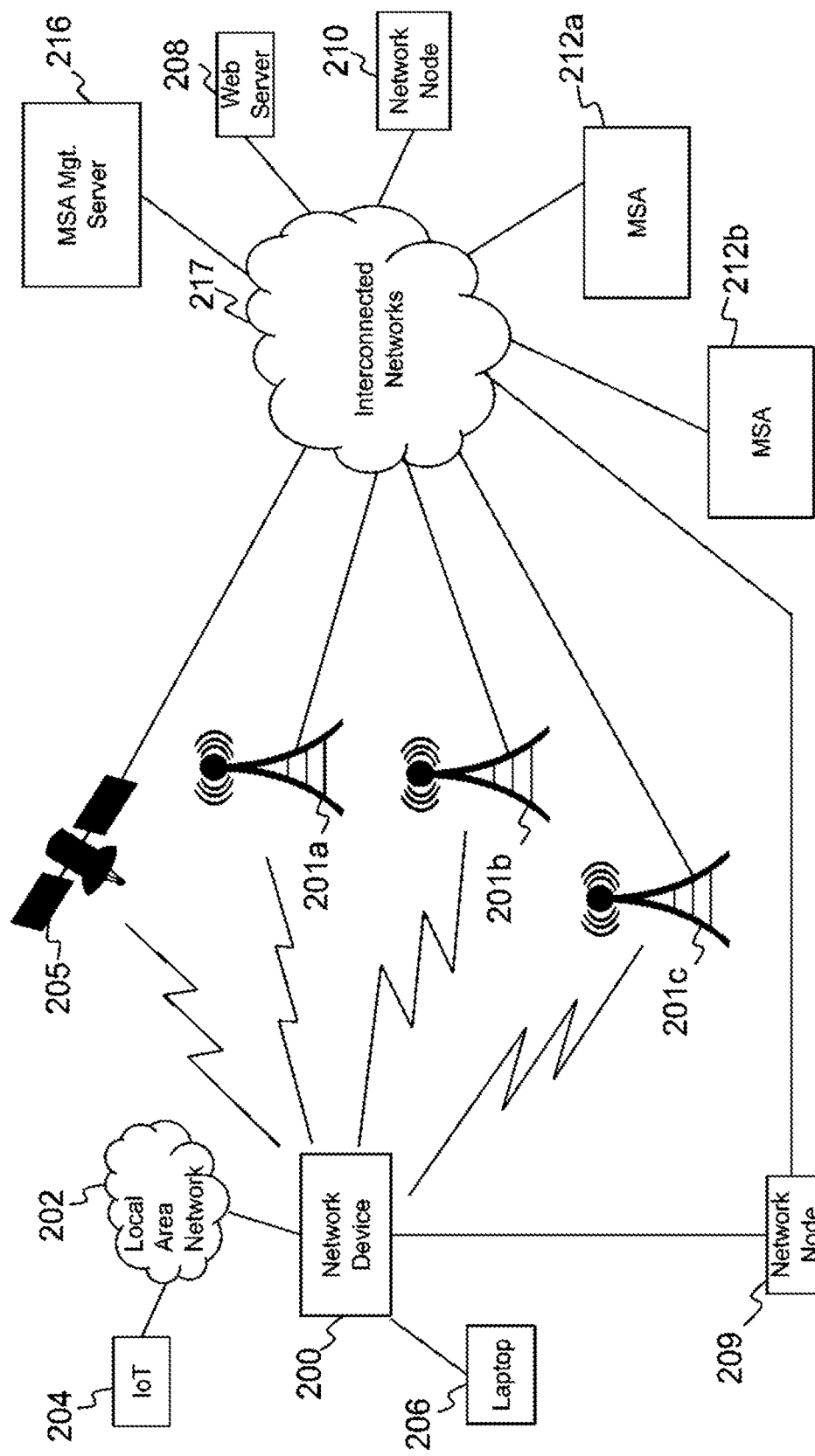
FIG. 2A is a schematic block diagram illustrating an exemplary network environment operable to utilize a plurality of SIMs for data communication in accordance with the exemplary embodiments of the present invention.

FIG. 2A is a schematic block diagram illustrating an exemplary network environment operable to utilize a plurality of SIMs for data communication in accordance with the exemplary embodiments disclosed herein. The plurality of SIMs may comprise removable SIMs or electronic SIMs. The electronic SIMs are eSIM profiles stored in one or more eUICCs placed in one or more MSAs. For example, the one or more MSAs are MSA 212a and 212b.

There are three cellular networks, cellular networks 201a-201c illustrated. Each cellular network may provide communication coverage for a corresponding geographical area using cellular technologies. Cellular networks 201a-201c may be operated by the same or different MNOs. For example, cellular networks 201a-201c may be operated by MNO A, B, and C, respectively.

Network device 200 may be similar or identical to network device 150 illustrated in FIG. 1B. Network device 200 is capable of communicating with web server 208, network node 210, MSAs 212, and MSA management server 216 through interconnected networks 217. Interconnected networks 217 may be similar or identical to interconnected networks 138. Network device 200 may connect with interconnected networks 217 through one or more cellular network connections established over cellular networks 201a-201c. The one or more cellular network connections may be established using any eSIM profiles from MSAs 212 or using a removable SIM placed in network device 200. When an eSIM profile is used to establish a cellular network connection over a cellular network, the eSIM profile should be from the same MNO that operates the cellular network. For example, when a cellular network connection is to be established over cellular network 201a using an eSIM profile, the eSIM profile used should be from MNO A.

Optionally, FIG. 2A also includes a satellite carrier network, for example, satellite carrier network 205. Satellite carrier network 205 may comprise one or more of a geostationary satellite or a low earth orbit satellite. For example, network device 200 may be under respective coverage of satellite carrier network 205 and may connect with interconnected networks 217 through one or more satellite data connections established over satellite carrier network 205.

Optionally, network device 200 is also capable of being connected with one or more wired communication networks. An exemplary wired communication network may include at least one network node 209. Network device 200 may connect to interconnected networks 217 through one or more wired data connections established using one or more network nodes, including network node 209.

Network device 200 may be connected with one or more hosts via a direct physical connection or through a connected local area network (LAN). For illustration purposes, network device 200 is connected to host Laptop 206 directly and host IoT 204 through LAN 202. Hosts 204 and 206 may connect to interconnected networks 217, or a host or server reachable via interconnected networks 217, through network device 200. Thus, network device 200 acts as a gateway between the hosts (206, 204) and the interconnected networks (217) to allow data packets to be routed through the one or more cellular network connections established over cellular networks 201a-201c.

Figure 2B:
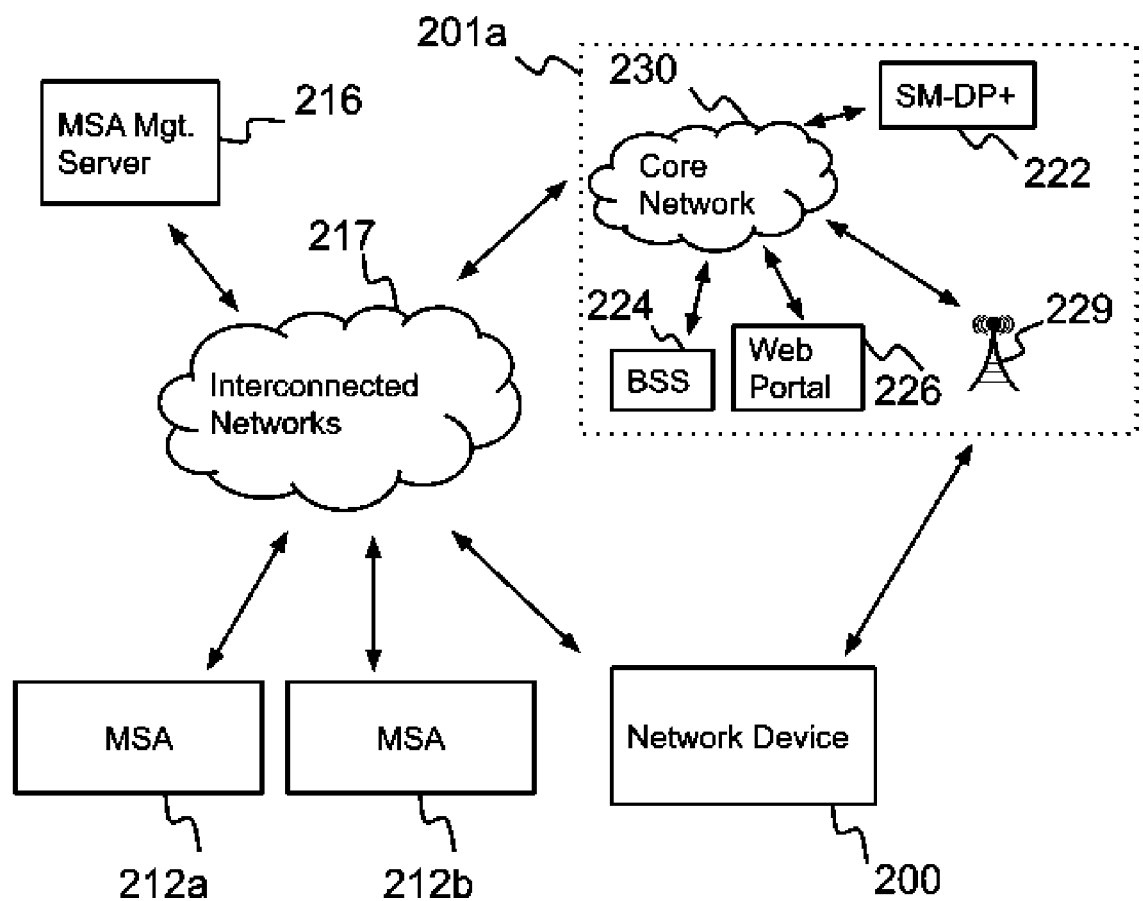
FIG. 2B is a schematic diagram illustrating a more detailed view of an exemplary cellular network operated by an MNO.

FIG. 2B is a schematic block diagram illustrating a more detailed view of an exemplary cellular network operated by an MNO. For example, the exemplary cellular network is cellular network 201a operated by MNO A. For illustration purposes, cellular network 201a may include a core network 230, a base station 229, a business support system (BSS) 224, a Web portal 226, and an eSIM subscription management server (e.g., SM-DP+) 222. In some embodiments, the eSIM subscription management server may also be referred to as a profile provisioning server. An eSIM subscription management server may be controlled by an MNO, a manufacturer of an eUICC, or a third party wireless communication service provider.

Core network 230 may be connected to BSS 224, web portal 226, base station 229, and SM-DP+ server 222 over WAN or LAN connections established through WAN or LAN interfaces. Network device 200 may access core network 230 through interconnected networks 217 or base station 229.

Interconnected networks 217 may also be used by MSA management server 216, cellular network 201a, network device 200, and MSAs 212a-b for data communication over wide area network (WAN) connections. Network device 200 may perform data communication with interconnected networks 217 or with a host reachable through interconnected networks 217 over one or more wired or wireless network connections. The wireless network connections may be established using Wi-Fi, WiMax, Bluetooth, or cellular networks. In some exemplary environments, a user of network device 200 may prefer the network device to connect with interconnected networks 217 through a cellular network because of its common availability, vast coverage area, flexibility of use, etc. For example, the cellular network may be cellular network 201a. To be connected with interconnected networks 217 over cellular network 201a, network device 200 may need to access core network 230 of cellular network 201a. When network device 200 has at least one eSIM profile or a removable SIM of MNO A available, network device 200 may access core network 230 over base station 229 of cellular network 201a. The at least one eSIM profile may be stored in at least one eUICC placed in at least one MSA accessible locally or remotely by network device 200. The removable SIM may be placed in a SIM slot that is connected to a processing unit of network device 200 through a SIM interface.

However, when network device 200 does not have at least one eSIM profile or a removable SIM of MNO A available, network device 200 may send a request for an eSIM profile to cellular network 201a. In this exemplary scenario, network device 200 may connect to the core network 230 of cellular network 201a over interconnected networks 217 for sending the request. Continuing with the exemplary scenario, network device 200 may connect with interconnected networks 217 over a wired or wireless network connection. The wireless network connection may be established using Wi-Fi®, Bluetooth®, or a different cellular network for which network device 200 has at least one eSIM profile or removable SIM available. For example, the request for an eSIM profile of MNO A may be sent through web portal 226 provided by MNO A for its potential customers or subscribers. In one variant, the request may be sent using an application provided by MNO A. The application may be made available for downloading in web portal 226 by MNO A or may be built-in by a manufacturer of an eUICC or network device 200. When an eSIM profile is received in response to the request, network device 200 may access core network 230 through base station 229 using the eSIM profile information. Thus, network device 200 becomes capable of connecting to interconnected networks 217 or a host reachable through interconnected networks 217 over cellular network 201a. The invention disclosed herein may be beneficial for reducing data communication costs using cellular networks in a visited geographical area and increasing the flexibility of establishing data connections.

Figure 3:
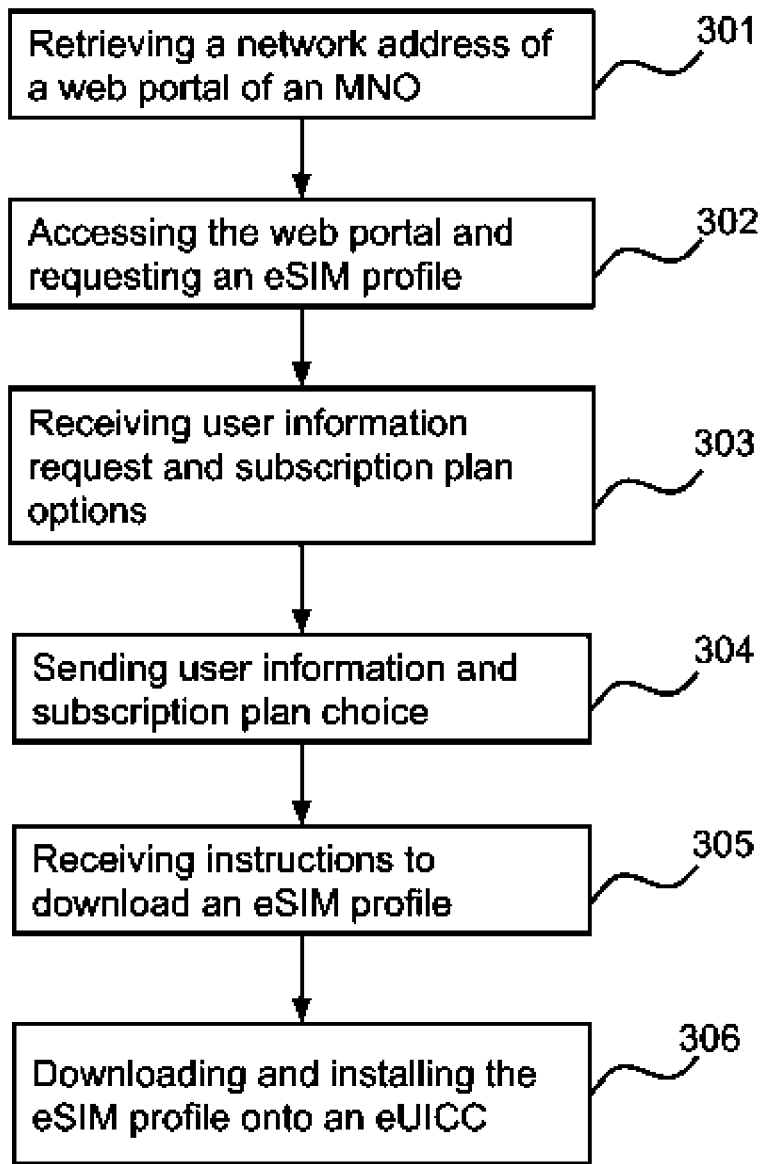
FIG. 3 is a process flow diagram illustrating a method to download at least one eSIM profile in an MSA comprising a plurality of eUICCs according to one exemplary embodiment.

FIG. 3 is a process flow diagram illustrating a method for downloading at least one eSIM profile to an MSA comprising a plurality of eUICCs according to an exemplary embodiment.

Processes disclosed in FIG. 3 may be performed by a processing unit of the MSA. The MSA may comprise at least one profile download capable WCM that is connected to the processing unit of the MSA directly or through a system bus. For illustration purposes, one exemplary MSA is MSA 100, and processing unit 101 is the processing unit of MSA 100, as shown in FIG. 1A. In one variant, the processes disclosed in FIG. 3 are performed by a processing unit of a network device when the network device comprises at least one eUICC.

In process 301, MSA 100 receives a network address of a web portal of an MNO, such as web portal 226 of MNO A. The network address of the web portal may be retrieved from a machine-readable code or from an over-the-air (OTA) message sent by MNO A. The machine-readable code may be received by an email from MNO A or collected by an administrator or user of the MSA from an offline sales point of MNO A. The machine-readable code may be in the form of a quick response (QR) code, an Aztec code, a MaxiCode, or in any other form of machine-readable code. Processing unit 101 of MSA 100 may retrieve the machine-readable code using a code reader application capable of reading the aforementioned machine-readable code.

In one variant, MSA 100 may not receive the machine-readable code directly from MNO A. The machine-readable code may be first received at an external device connected to MSA 100. The external device may have a code reader application to decode and a camera module to scan the machine-readable code. Then, the decoded data of the machine-readable code may be received by MSA 100 from the external device through near field communication (NFC) technology, LAN, WAN, or a console connection.

In process 302, MSA 100 accesses web portal 226 using the network address from the machine-readable code and requests for an eSIM profile. In response to the eSIM profile request, in process 303, MSA 100 may receive user information requests and subscription plan options offered by MNO A. The information that is required as user information may vary based on MNOs. For example, some common information required by MNOs includes the primary location of use, name, contact details, social security number, date of birth, billing information, etc. The offered subscription plans may be shown on the web portal. For example, some subscription plans may be used only for voice communication, some subscription plans may be used only for data communication, and some subscription plans may be used for both voice and data communication. There is no limitation on the number of subscription plans shown in the options; it depends entirely on an MNO. Each subscription plan may have a different pricing level. In one variant, MNO A may also require an eUICC ID in process 303. An eUICC ID is an eUICC identifier and is used to uniquely identify an eUICC.

In process 304, MSA 100 sends the user information and a subscription plan choice. MSA 100 may also send an eUICC ID of an eUICC that is selected from a plurality of eUICCs when an eUICC ID is required by MNO A. MSA 100 may receive the user information from a user or administrator through an input unit connected to MSA 100. In one variant, the user information may already be stored in a storage unit of MSA 100, and after process 303, MSA 100 may retrieve the user information and send it to MNO A in process 304.

In process 305, MSA 100 may receive instructions to download an eSIM profile corresponding to the subscription plan specified when the provided user information is verified by MNO A. On the other hand, when the user information fails to be verified by MNO A, a notification of the verification failure may be received. In that case, MSA 100 may notify the user or administrator of the verification failure and await further instructions from the user or administrator. In one variant, after notifying the user or administrator about the verification failure, MSA 100 may stop the method described in FIG. 3, or operate in standby mode.

However, for illustration purposes, in this exemplary scenario, it is supposed that the user information provided by MSA 100 is verified by MNO A and instructions to download an eSIM profile is received. Therefore, in process 306, MSA 100 may download the eSIM profile according to the instructions provided by MNO A and install the eSIM profile onto the eUICC to which the eSIM profile is assigned. The eSIM profile may be assigned to an eUICC based on its eUICC ID. MNO A may detect the eUICC ID when MSA 100 accesses web portal 226. In one variant, the eUICC ID may be sent with the user information as disclosed in process 304. When an eUICC ID of a selected eUICC is sent in process 304, the eSIM profile received is to be installed on the selected eUICC. In another variant, an eUICC ID of the selected eUICC may be sent with the eSIM profile request in process 302. Once the eSIM profile is successfully downloaded and installed onto the selected eUICC, the eSIM profile becomes ready to be used to establish cellular network connection(s) over cellular network 201a of MNO A.

Figure 4:
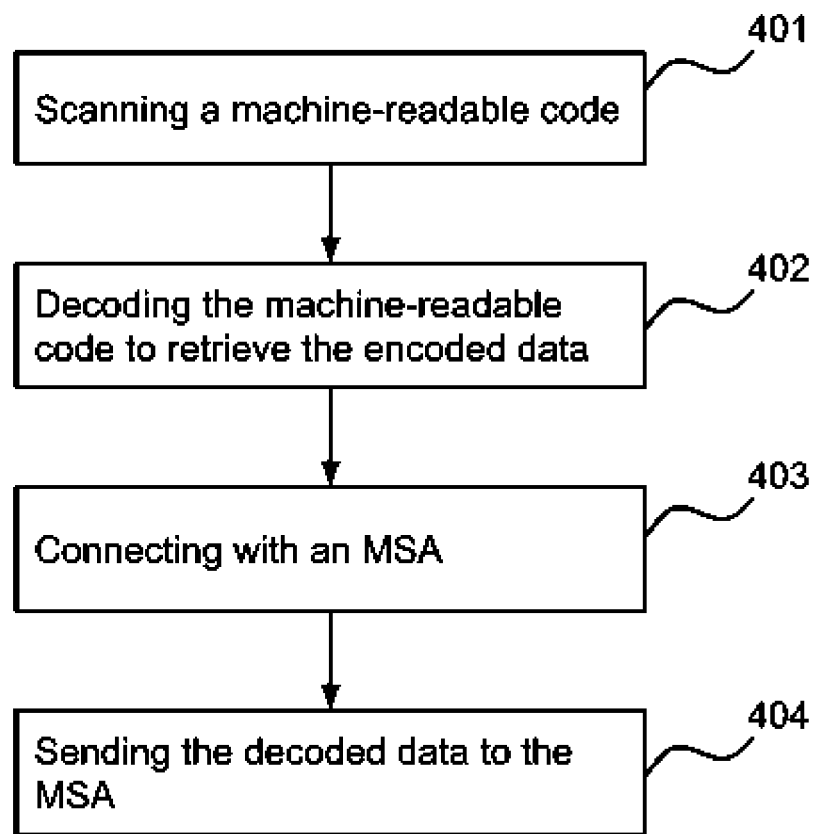
FIG. 4 is a process flowchart illustrating a method for decoding a machine-readable code at an external device and sending the decoded data to an MSA or a network device.

FIG. 4 is a process flowchart illustrating a method for decoding a machine-readable code at an external device and sending the decoded data to an MSA or a network device. For illustration purposes, the decoded data is sent to an MSA, such as MSA 100. The processes illustrated herein may be stored as program instructions in a memory unit and executable by a processing unit connected to the memory unit. The memory unit and the processing unit may be placed in the external device. The external device may also comprise at least one camera module to scan the machine-readable code. The external device may be a computer, a laptop, a tablet, a personal digital assistant (PDA), or a smartphone. The machine-readable code may be provided initially by an MNO by email, in a voucher, or using any other means applicable.

At process 401, a machine-readable code is scanned using the at least one camera module placed in the external device. The machine-readable code may be displayed on a printed medium, such as paper, sticker, or voucher. Alternatively, the machine-readable code may be displayed on an electronic display unit.

At process 402, the machine-readable code is decoded using a code reading application to retrieve the encoded data. The code reading application may be stored in the memory unit of the external device.

At process 403, a connection is established between the external device and MSA 100. The connection may be established using NFC, LAN, WAN, or console lines. There is no limitation that process 403 should be performed after process 402. Process 403 may also be performed before process 401 or 402.

At process 404, the decoded data of the machine-readable code is sent to MSA 100. When the external device is connected to MSA 100 over a WAN connection, the decoded data should be encapsulated in one or more encapsulating IP packets before sending it to MSA 100. When the decoded data is encapsulated in one or more encapsulating IP packets, MSA 100 may need to decapsulate the one or more encapsulating packets before retrieving the decoded data from the machine-readable code. MSA 100 may then use the decoded data to activate an eSIM profile download as discussed under FIG. 3. There is no limitation that the decoded data may only be sent to an MSA. In one variant, the decoded data may also be sent to a network device, such as network device 150.

Figure 5:
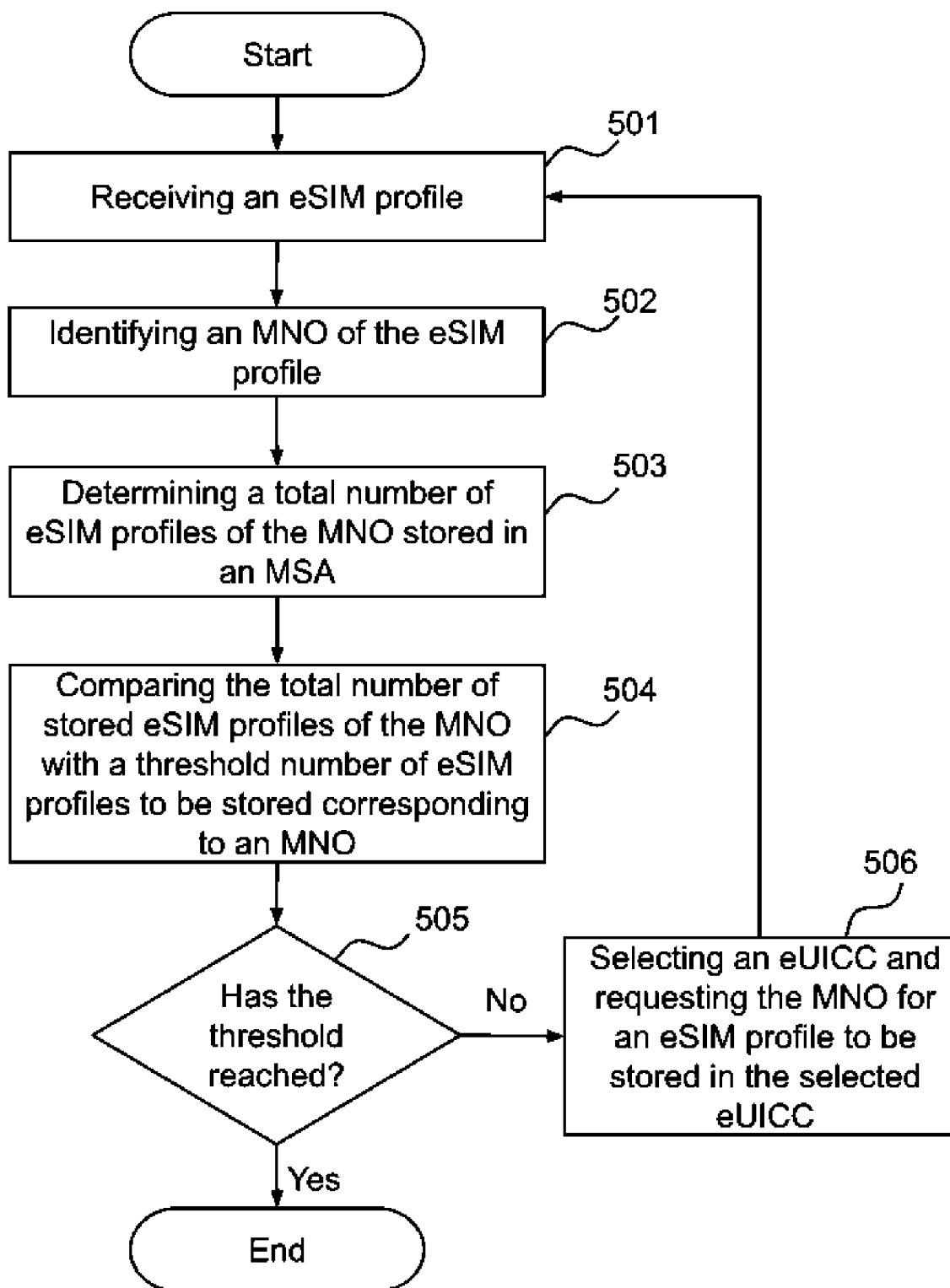
FIG. 5 is a process flow diagram illustrating a method for obtaining a threshold number of eSIM profiles to be stored in an MSA corresponding to an MNO.

FIG. 5 is a process flow diagram illustrating a method for obtaining a threshold number of eSIM profiles to be stored corresponding to an MNO. For illustration purposes, the eSIM profiles are stored in one or more eUICCs placed in an MSA, such as MSA 100. The method starts in process 501 when an eSIM profile is received at MSA 100. In process 502, MSA 100 identifies the MNO of the eSIM profile received. An MNO may be identified using its MNO ID. An MNO ID may be a Public Land Mobile Network (PLMN) ID that consists of a Mobile Country Code (MCC) and a Mobile Network Code (MNC). For illustration purposes, the eSIM profile is received from MNO A.

In process 503, processing unit 101 of MSA 100 determines the total number of eSIM profiles of MNO A stored in MSA 100. The total number of eSIM profiles of MNO A is equal to the sum of the eSIM profiles of MNO A stored in one or more eUICCs placed in MSA 100, and the eSIM profile received. It should be noted that the one or more eUICCs may be storing eSIM profiles from different MNOs, for example, from MNO B or MNO C which will not be counted when counting the total number of eSIM profiles of MNO A. Processing unit 101 of MSA 100 may ascertain the number of eSIM profiles of MNO A stored in one or more eUICCs placed in MSA 100 from an eSIM profile lookup table. An eSIM profile lookup table, according to one exemplary embodiment of the present invention, comprises all or part of the information of all eSIM profiles stored in one or more eUICCs placed in MSA 100. The eSIM profile lookup table may be stored in a storage unit placed in or connected to MSA 100.

In process 504, MSA 100 compares the total number of stored eSIM profiles of MNO A with a threshold number of eSIM profiles to be stored corresponding to an MNO. The threshold number of eSIM profiles to be stored corresponding to an MNO may be set manually by a user or administrator of MSA 100 or set by default by a manufacturer of the MSA. The threshold number of eSIM profiles to be stored corresponding to an MNO should be lower than or equal to the number of eUICCs placed in MSA 100.

In process 505, MSA 100 determines whether the threshold number of eSIM profiles to be stored corresponding to an MNO is reached. The threshold is reached when the total number of stored eSIM profiles of MNO A is equal to the threshold number of eSIM profiles to be stored corresponding to an MNO. For example, the threshold number of eSIM profiles to be stored corresponding to an MNO is five, and the total number of stored eSIM profiles of MNO A is three; therefore, the threshold is not reached.

When a threshold is not reached, processing unit 101 of MSA 100 follows the "No" branch as shown in FIG. 5 and performs process 506. In process 506, an eUICC is selected, that is not already storing an eSIM profile of MNO A, from the one or more eUICCs placed in MSA 100, and a request is sent to MNO A for an eSIM profile for the selected eUICC. The request for an eSIM profile may comprise the eUICC ID of the selected eUICC and user information. The operation of requesting an eSIM profile and downloading the eSIM profile may be performed according to the exemplary method discussed in FIG. 3 or according to the exemplary methods in FIG. 7 or 8 (discussed later). After performing process 506, processes 501-505 are repeated. Continuing with the example, after repeating processes 501-505 once, the total number of stored eSIM profiles of MNO A becomes 4. As according to the example, the threshold number of eSIM profiles to be stored corresponding to an MNO is five; therefore, the threshold is not yet reached. As a result, process 506 is performed again. Process 506 is iterated until the threshold is reached, and with each repetition, an eUICC is selected that is not already storing an eSIM profile of MNO A.

According to the example, when the total number of stored eSIM profiles of MNO A becomes five, the threshold is reached. When the threshold number of eSIM profiles to be stored corresponding to an MNO is reached, the method ends. One of the benefits of storing a threshold number of eSIM profiles corresponding to an MNO may be the ability to establish an expected number of cellular network connections over the cellular network of the MNO and thereby increasing the speed of data communication. For illustration purposes, when MSA 100 stores five eSIM profiles of MNO A in five eUICCs, the five eSIM profiles may be used concurrently by one or more network devices to establish at least five cellular network connections at the same time.

Figure 6A:
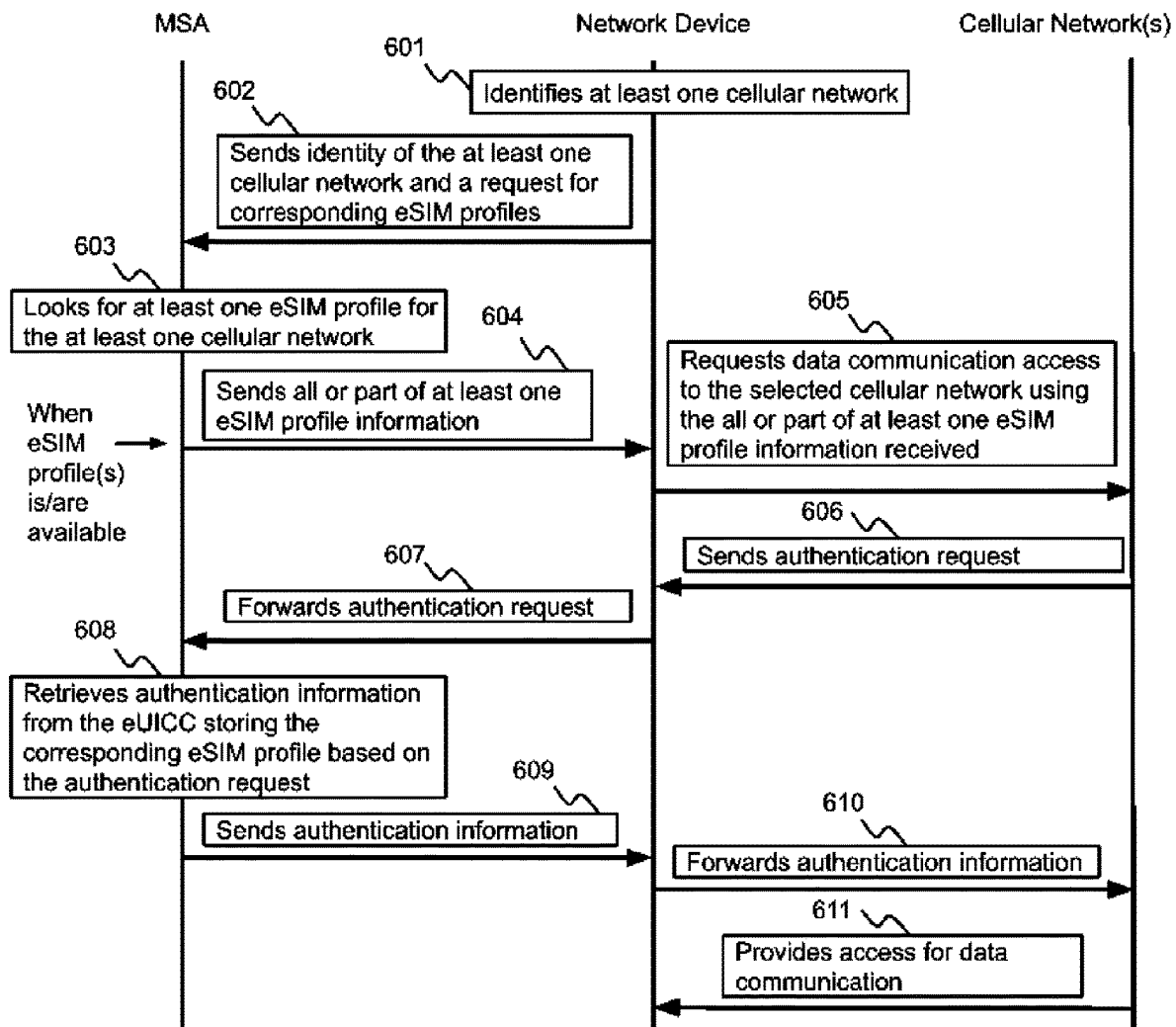
FIG. 6A is a process flow diagram illustrating a method for establishing at least one cellular network connection at a network device according to an exemplary embodiment of the present invention.

FIG. 6A is a process flow diagram illustrating a method for establishing at least one cellular network connection at a network device according to an exemplary embodiment of the present invention. For example, the at least one cellular network connection is to be established at network device 150.

In process 601, processing unit 155 of network device 150 identifies at least one cellular network available in its current geographical area. The at least one cellular network may be identified by performing a scan by network device 150 using an available WCM. The WCM may be placed in network device 150 or connected externally. The WCM may comprise an antenna for transmitting and receiving radio signals. The antenna may also be connected externally to the WCM. Without limiting the scope of the present invention, network device 150 may be fixed, as such, used in a particular geographical area, or it may be mobile, thus, capable of being used in different geographical areas depending on use cases. Network device 150 may be located in the home geographical area or a visited geographical area.

In process 602, processing unit 155 of network device 150 sends cellular network identity information of the identified at least one cellular network to an MSA (for example, MSA 100) and requests for at least one eSIM profile of the identified at least one cellular network. The cellular network identity information may comprise MNO ID (PLMN ID) and/or other associated information of the identified at least one cellular network that may be used by MSA 100 to identify an eSIM profile corresponding to the identified at least one cellular network. In one variant, in some exemplary scenarios, a cellular network of an MNO may also be used by one or more mobile virtual network operators (MVNOs) for providing communication services. In such instances, the cellular network identity information may also comprise the identity of the one or more MVNOs and the request for at least one eSIM profile may correspond to eSIM profile(s) of at least one MNO and/or MVNO to the identified at least one cellular network. However, for illustration purposes in the present disclosure, it is supposed that a cellular network corresponds to one MNO. Network device 150 may send the cellular network identity information and the request for at least one eSIM profile over the Internet. In one variant, the cellular network identity information and the request for at least one eSIM profile may be sent by a Short Message Service (SMS) message.

In process 603, processing unit 101 of MSA 100 reads an eSIM profile lookup table to determine whether at least one eSIM profile corresponding to the identified at least one cellular network is available. Processing unit 101 may use the cellular network identity information to identify at least one eSIM profile belonging to the identified at least one cellular network. The eSIM profile lookup table may be stored in a storage unit that is placed in or connected externally to MSA 100. For example, the storage unit is storage 105 shown in FIG. 1A. The eSIM profile lookup table comprises a list of all eSIM profiles stored in one or more eUICCs placed in MSA 100. There is no limitation that the eUICCs should be placed in the MSA. The eUICCs may be placed in an external device or another MSA connected to MSA 100.

When at least one eSIM profile of the identified at least one cellular network is found as available, in process 604, MSA 100 sends all or part of information of at least one eSIM profile from the available at least one eSIM profile to network device 150. The all or part of information may include subscriber identity information comprising IMSI, location area identity (LAI), user identity, and other associated information that may be required by an MNO to identify a subscriber or user. Upon receiving the all or part of information of the at least one eSIM profile from MSA 100, in process 605, network device 150 sends a request for data communication access to at least one corresponding MNO of the at least one eSIM profile of which information is received. The request sent using the all or part of information received in process 604. The request may be sent over the Internet. After that, in process 606, the at least one corresponding MNO of the at least one eSIM profile of which information is received may request authentication information from network device 150.

However, when no eSIM profile is found as available in process 603, MSA 100 sends a negative response to network device 150 in process 604 instead of sending eSIM profile information. Upon receiving the negative response from MSA 100, network device 150 may notify a user or administrator that no eSIM profile is found and end the method. The notification may be displayed on a display connected to network device 150. There is no limitation on the techniques of notifying a user or administrator; any means of notification may be used. In another variant, upon receiving the negative response from MSA 100, processing unit 155 of network device 150 initiates operations for downloading at least one eSIM profile of the identified at least one cellular network.

In process 607, processing unit 155 of network device 150 forwards the authentication request sent by the at least one corresponding MNO of the at least one eSIM profile to MSA 100. In process 608, processing unit 101 of MSA 100 retrieves authentication information responsive to the authentication request from a corresponding eSIM profile stored in an eUICC that is connected to or placed in MSA 100. For illustration, the eSIM profile may be stored in any of the eUICCs 116.

In process 609, processing unit 101 of MSA 100 sends the retrieved authentication information to network device 150. In process 610, processing unit 155 of network device 150 forwards the authentication information received from MSA 100 to the at least one corresponding MNO of the at least one eSIM profile. Based on the validity of the authentication information sent by network device 150, the MNO may provide access to network device 150 for data communication in process 611.

Figure 6B:
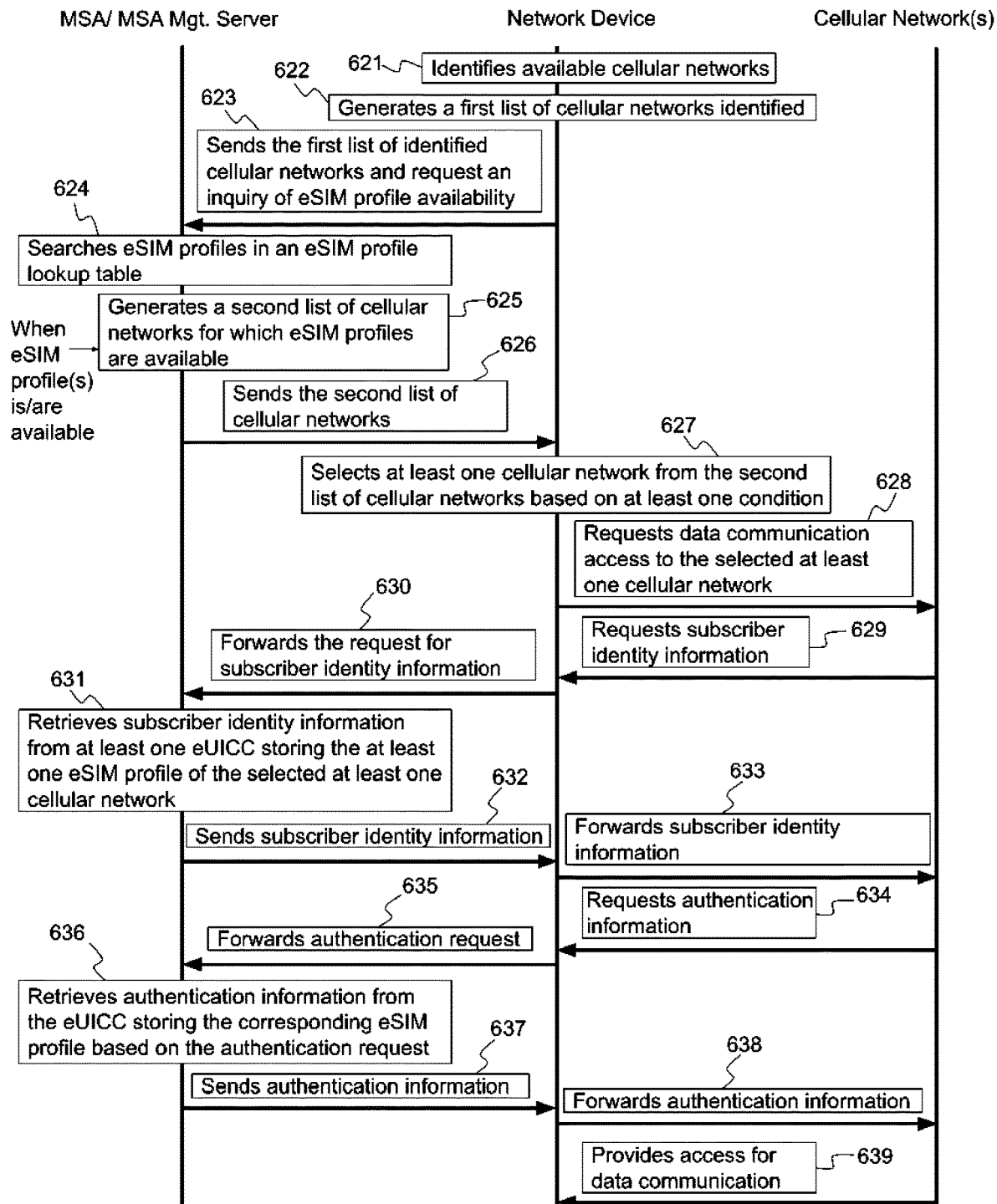
FIG. 6B is a process flow diagram illustrating a method for establishing one or more cellular network connections at a network device according to one exemplary embodiment of the present invention.

FIG. 6B is a process flow diagram illustrating a method for establishing one or more cellular network connections at a network device according to one exemplary embodiment of the present invention. Processes described in FIG. 6B may be performed in an MSA, in an MSA management server, in a network device, and/or in a device of an MNO by the respective processing units. When an MSA management server is used, the MSA management server may be connected to one or more MSAs housing one or more eUICCs, where the one or more MSAs are remotely manageable through the MSA management server. For illustration purposes, an exemplary network device may be network device 150, an exemplary MSA may be MSA 100 and an exemplary MSA management server may be MSA management server 216.

In process 621, processing unit 155 of network device 150 identifies one or more cellular networks available. The one or more cellular networks may be identified in the same manner as disclosed in step 601 of FIG. 6A. In process 622, processing unit 155 of network device 150 generates a first list of cellular networks based on the cellular networks identified in process 621. The number of cellular networks identified in process 621 and the number of cellular networks in the first list of cellular networks may be the same or different. In one variant, the first list of cellular networks may comprise identities of all the cellular networks identified in process 621.

In another variant, some of the identified cellular networks may be filtered out by checking against a signal strength level threshold. Thus, the first list of cellular networks will comprise only the cellular networks for which a signal strength level threshold is met. The value of the signal strength level threshold may be set manually by the administrator, built-into the firmware by the manufacturer, or downloaded remotely from a remote server.

In process 623, processing unit 155 of network device 150 sends the first list of cellular networks to an MSA or MSA management server and requests an inquiry whether any eSIM profile of the cellular network(s) in the first list is available. For illustration purposes, the processing unit 155 of network device 150 sends the first list of cellular networks and requests an inquiry to MSA 100.

In process 624, processing unit 101 of MSA 100 reads an eSIM profile lookup table to identify eSIM profiles corresponding to the cellular network(s) in the first list of cellular networks. Alternatively, when an MSA management server is used, the processing unit of the MSA management server will look for the corresponding eSIM profiles of the cellular network(s) in the first list of cellular networks in all of the connected MSAs.

There may be three possible outcomes of process 624. First, one or more eSIM profiles may be found as available for all of the cellular network(s) in the first list of cellular networks. Second, one or more eSIM profiles may be found as available for only some of the cellular networks in the first list of cellular networks when the first list of cellular networks comprising a plurality of cellular networks. And third, no eSIM profiles may be found as available for any of the cellular network(s) in the first list of cellular networks. Based on the outcome, processing unit 101 of MSA 100 sends a response to network device 150. For example, for the first and second outcomes, processing unit 101 of MSA 100 or the processing unit of the MSA management server generates a second list of cellular networks in the next process (process 625) wherein the second list of cellular networks comprises the cellular network(s) for which at least one corresponding eSIM profile is found as available. However, for the third outcome, when no eSIM profile is found as available, processing unit 101 of MSA 100 or the processing unit of the MSA management server sends a negative response to network node 150 to notify about the unavailability of eSIM profiles and stops the method. When a negative response is received, the same functions may be performed as discussed under FIG. 6A.

In process 626, processing unit 101 of MSA 100 or the processing unit of the MSA management server sends the second list of cellular networks to network device 150. After receiving the second list of cellular networks, in process 627, processing unit 155 of network device 150 selects a cellular network from the second list of cellular networks based on at least one condition. There is no limitation that only one cellular network should be selected, in one variant, a plurality of cellular networks may be selected. However, in some exemplary scenarios, the second list of cellular networks may contain only one cellular network. In such cases, the cellular network in the second list of cellular networks is selected without applying any condition.

The at least one condition may be based on signal strength. When the second list of cellular networks includes a plurality of cellular networks, a cellular network with the highest signal strength is selected. The signal strength of the cellular networks may be detected by the network device.

The at least one condition to select the cellular network(s) may also be based on one or more of the following criteria: tariff cost, network performance, network types, administrator's preference, and/or the service quality of cellular networks' MNO.

When selecting a cellular network based on service quality, a cellular network of an MNO that provides better quality of service will be selected. The service quality of an MNO may be evaluated based on different criteria including, but not limited to, network coverage, security, and simplicity of configuration.

When selecting a cellular network based on the administrator's preference, an administrator of network device 150, MSA 100, or MSA management server 216 may assign priority to each cellular network detected. Thus, when priority is assigned, a cellular network with a higher priority will be selected. An administrator may assign the priority level to a cellular network based on the aforementioned criteria or not based on any of the criteria.

In process 628, network device 150 requests data communication access to the selected at least one cellular network. Responsive to the request for data communication access, the corresponding MNO of the at least one cellular network may request for subscriber identity information from network device 150 in process 629. In process 630, network device 150 forwards the subscriber identity information request to MSA 100. In one variant, in process 630, processing unit 155 of network device 150 forwards the subscriber identity information request to the MSA management server, in such scenario, the MSA management server further forwards the subscriber identity information request to MSA 100. After receiving the subscriber identity information request, in process 631, processing unit 101 of MSA 100 retrieves subscriber identity information, responsive to the subscriber identity information request, from at least one eUICC storing at least one eSIM profile of the selected at least one cellular network.

In process 632, processing unit 101 of MSA 100 sends the retrieved subscriber identity information to network device 150. In one variant, when MSA 100 receives the subscriber identity information request through the MSA management server, MSA 100 sends the retrieved subscriber identity information to the MSA management server in process 632. The MSA management server then forwards the retrieved subscriber identity information to network device 100. After that, network device 150, in process 633, forwards the subscriber identity information to the MNO of the selected at least one cellular network. After receiving the subscriber identity information, the corresponding MNO of the selected at least one cellular network may determine the validity of the subscriber identity information. When the subscriber information is valid, steps 634-639 are performed similarly to steps 606-611 as described in FIG. 6A. After the successful completion of steps 634-639, data communication over the selected at least one cellular network is obtained.

However, when the subscriber identity information is not valid, a validity error notification may be received at network device 150 from the corresponding MNO of selected at least one cellular network and data communication access may be denied. The processing unit of network device 150 may notify the administrator of the validity error and await further instructions or turn into standby mode. In standby mode, all processes of network device 150 may be paused until the next instructions are received from an administrator and thereby, unnecessary resource waste may be reduced when there is a significant delay before receiving any further instructions. In one variant, some processes may still be running in standby mode which are customized in such manner by the administrator or set as default by the manufacturer.

FIG. 7 is a process flow diagram illustrating a method for downloading at least one eSIM profile in an MSA according to one exemplary embodiment of the present invention. The method illustrated in FIG. 7 initiates at process 701 when a negative response is received at a network device, for example, at network device 150. As discussed in FIGS. 6A and 6B, a negative response is sent by MSA 100 to network device 150 when no eSIM profile is found by MSA 100 in the eSIM profile lookup table in response to an eSIM profile request sent by network device 150. It should be noted that, before process 701, MSA 100 and network device 150 should be connected over the Internet. The connection to the Internet may be achieved by network device 150 using a roaming cellular network connection, Wi-Fi, or any other means which enables network device 150 to access the Internet.

In process 702, processing unit 155 of network device 150 sends a request for at least one eSIM profile to the MNO of the at least one selected cellular network over the Internet. The selection of the at least one cellular network from a plurality of identified cellular networks is discussed under FIG. 6B. In one variant, a request for at least one eSIM profile is sent to the respective MNO of each of the identified cellular networks.

In one variant, the request sent in process 702 for at least one eSIM profile is generated by processing unit 155 of network device 150 based on one or more event triggers and not driven by process 701. For illustration purposes, the events of the event triggers may include, but not limited to, detecting a change of its current geographical area by network device 150, receiving a negative response from MSA 100 or detecting a cellular network for the first time. When process 702 is based on event triggers, processing unit 155 of network device 150 may monitor the events and match with the event triggers. When an event matches with any events of the event triggers, processing unit 155 of network device 150 provides necessary instructions to a profile download capable WCM to perform process 702. For example, process 702 is set to be triggered by the event of "receiving a negative response from MSA 100". Therefore, on the instance a negative response from MSA 100 is received at network device 150, processing unit 155 performs process 702.

In one variant, in order to save data storage space, all the events including the events of the event triggers may be represented by a unique code. When coding is applied for event triggers, if an event occurs, processing unit 155 analyses the unique code of the event to decide on whether the event matches with a code of an event trigger. When the code of the event matches with a code of the event trigger, processing unit 155 performs the function that is set to be triggered with the event trigger. When the code of the event does not match with a code of an event trigger, no function is triggered.

In process 703, the MNO of the selected at least one cellular network may request at least one eUICC ID in response to the at least one eSIM profile request. In another variant, the MNO may also request other associated information that may be required for providing an eSIM profile to network device 150. When a plurality of eSIM profiles is requested from a specific MNO, the MNO may require a plurality of eUICC IDs so that each eUICC can be used to store one eSIM profile of that MNO. A plurality of eSIM profiles from a specific MNO may be requested by network device 150 in order to establish a plurality of concurrent cellular network connections over the cellular network of that MNO using the plurality of eSIM profiles.

In process 704, network device 150 forwards the requests for at least one eUICC ID and other associated information received from the MNO of the selected cellular network to MSA 100. In one variant, network device 150 may already have the eUICC ID(s) and associated information stored in a storage unit placed in it. Thus, when the network device receives a request for at least one eUICC ID and other associated information from the MNO of the selected cellular network, the network device retrieves at least one eUICC ID and associated information from the storage unit and replies to the request.

In process 705, processing unit 101 of MSA 100 selects at least one available eUICC placed in MSA 100 and retrieves at least one eUICC ID information from the selected at least one eUICC. In one variant, processing unit 101 also retrieves associated information from a storage unit connected to MSA 100.

In process 706, processing unit 101 of MSA 100 sends the retrieved at least one eUICC ID information to network device 150. In one variant, in process 706, MSA 100 also sends other associated information along with the retrieved eUICC ID information when associated information is requested by the corresponding MNO and when the associated information is stored in a storage unit connected to MSA 100.

In process 707, processing unit 155 of the network device 150 forwards the received at least one eUICC ID information to the MNO of the selected cellular network. In one variant, network device 150 also forwards other associated information along with the at least one eUICC ID information when associated information is requested by the corresponding MNO. The associated information may be received from MSA 100, retrieved from a storage unit connected to network device 150, or collected from an input unit connected to network device 150. The MNO of the selected at least one cellular network receives the at least one eUICC ID information or the at least one eUICC ID and associated information provided by network device 150 and decides whether to provide at least one eSIM profile based on the validity of the provided information. When a decision is made to provide at least one eSIM profile, the BSS of the selected at least one cellular network's MNO may send a request to an eSIM subscription management server (SM-DP+) for preparing and providing at least one eSIM profile to network device 150.

In process 708, SM-DP+ server of the MNO corresponding to the selected at least one cellular network securely provides the at least one eSIM profile to network device 150 for installing in the selected at least one eUICC. Network device 150 receives the at least one eSIM profile through a profile download capable WCM. Processing unit 155 of network device 150 then forwards the at least one eSIM profile to MSA 100 in process 709. Upon receiving the at least one eSIM profile, processing unit 101 of MSA 100 installs the at least one eSIM profile onto the selected at least one eUICC. After the successful completion of the method illustrated in FIG. 7, the at least one eSIM profile becomes ready to be used to establish at least one cellular network connection over the selected at least one cellular network.

FIG. 8A is a process flow diagram illustrating exemplary communications among an MSA, an MSA management server, a network device, and an MNO when downloading eSIM profile(s) onto one or more eUICCs placed in the MSA. For example, an exemplary MSA is MSA 100 shown in FIG. 1A, the MSA management server is MSA management server 216 shown in FIG. 1D, and the network device is network device 150 shown in FIG. 1B. There is no limitation on the number of MSAs and MNOs that may be involved. For illustration purposes, one MSA and one MNO are shown. MSA management server 216, MSA 100, network device 150, and MNOs are capable of being connected over interconnected networks (for example, the Internet), such as interconnected networks 217 as shown in FIG. 2A. The MSA management server may be used to manage one or more MSAs when downloading eSIM profiles onto the eUICCs placed in the one or more MSAs and also when providing eSIM profile information from the one or more MSAs to a network device for establishing at least one cellular network connection.

The method described in FIG. 8A initiates at process 801 based on an event trigger. The event may include, but not limited to, receiving instructions from an administrator or user of MSA management server 216 to download eSIM profiles, receiving a request to download eSIM profiles from a network device, failing to find at least one eSIM profile while performing eSIM profile lookup in the eSIM profile lookup table, and the detection of changes in the location of a network device. In order to detect changes in the location of a network device, MSA management server 216 may periodically inspect the location of the one or more network devices (e.g., network device 150) connected to it.

In process 801, processing unit 181 of MSA management server 216 sends a request to network device 150 to download one or more eSIM profiles that are to be stored in one or more eUICCs placed in MSA 100.

Upon receiving the request for downloading one or more eSIM profiles from MSA management server 216, processing unit 155 of network device 150, in process 802, instructs an available WCM connected to processing unit 155 to scan for available cellular networks. The WCM may be placed in network device 150 or externally connected to network device 150. Based on the instructions from processing unit 155, the WCM scans for available cellular networks in the current geographical area of network device 150. Process 802 may have different outcomes. For example, (i) only one cellular network may be detected, (ii) a plurality of cellular networks may be detected and, (iii) no cellular network may be detected. However, in this age of technological development, there is a higher possibility that a plurality of cellular networks will be detected as there is more than one mobile network operator available in a geographical area.

As such, when a plurality of cellular networks is detected, processing unit 155 of network device 150, in process 803, selects at least one cellular network from the detected cellular networks based on at least one condition. The at least one condition based on which the at least one cellular network is selected may be determined from a group of conditions including, but not limited to, signal strength, tariff cost, network performance, network types, administrator's preference, and/or service quality of cellular networks' MNO. Information regarding the conditions may be collected by network device 150, sent by MSA management server 216, sent by MSA 100, and/or received from one or more inputs by an administrator or user.

However, when only one cellular network is detected in process 802, process 803 may be omitted and the next process is performed taking the detected cellular network as the selected cellular network. When no cellular network is detected in process 802, network device 150 may send a message to MSA management server 216 that no cellular network is detected and stop the processes. In another variant, network device 150 sends a message to MSA 100 that no cellular network is detected and stops the processes. In another variant, when no cellular network is detected, network device 150 keeps rescanning for available cellular networks at a certain time interval until at least one cellular network is detected. In another variant, when no cellular network is detected, network device 150 may rescan for available cellular networks when a change of a certain distance in the location of the network device is detected.

In process 804, processing unit 155 of network device 150 sends a request for at least one eSIM profile to the MNO of the selected cellular network. The request may be sent over the Internet using a WCM that is capable of downloading eSIM profiles. There is no limitation on the means for accessing the Internet by network device 150. For illustration purposes, network device 150 may access the Internet over wired Internet connections, such as cabled Internet connection, fiber optics Internet connection or digital subscriber line (DSL) Internet connection, or over wireless Internet connections, such as Wi-Fi®, satellite connection or cellular network connection. When network device 150 accesses the Internet over a cellular network connection, the connection may be a roaming connection or a local cellular network connection. When the method of FIG. 8A is triggered by the event of failing to find eSIM profiles while searching eSIM profile in the eSIM profiles look-up table, network device 150 may not access the Internet over a local cellular network connection as this event occurs when network device 150 does not have an eSIM profile available to access a local cellular network.

In another variant, step 803 may be omitted, and in step 804, at least one eSIM profile request is sent to the MNO(s) of all of the detected cellular networks in step 802. The benefits of doing so may be to diversify the eSIM profile reserves at one or more MSAs similar to MSA 100. Thus, when a different cellular network becomes preferable due to a change in a condition, it will not be necessary to download an eSIM profile for the newly preferable cellular network as the eSIM profile of that cellular network may already be downloaded.

In process 805, the MNO of the selected cellular network may request at least one eUICC ID and other associated information that may be required to provide an eSIM profile from network device 150. In one variant, the request is only for the at least one eUICC ID and the associated information may not be required or may be collected by the MNO by any method known in the art. The at least one eUICC ID should be of the at least one eUICC on which the at least one eSIM profile is to be stored. It should be noted that the number of eUICC IDs required depends on the number of eSIM profiles requested from a selected cellular network. For example, when the number of eSIM profiles requested is two, the number of eUICC IDs required by the selected cellular network should also be two. In another variant, a plurality of eSIM profiles of a selected cellular network may be stored in a single eUICC if such facilities are supported by the MNO of the selected cellular network. In that case, even if a plurality of eSIM profiles are requested by network device 150, only one eUICC ID may be required by the selected cellular network. The other associated information that may be required by an MNO along with an eUICC ID may vary depending on the MNO. For illustration, the required associated information may include, user's identity information, user's home location information, user's billing information, and/or user's contact details.

In process 806, network device 150 forwards the request for at least one eUICC ID and associated information to MSA management server 216. In process 807, MSA management server 216 may generate another request based on at least a part of the request received from network device 150 and send it to MSA 100. The request sent by MSA management server 216 may comprise a request for at least one eUICC ID only, wherein the other associated information required by the MNO may be retrieved by the processing unit of MSA management server 216 from a storage unit or collected from an input unit. Both the storage unit and the input unit may be connected locally or remotely with MSA management server 216. When the input unit is remotely connected with MSA management server 216, input data may be provided using a web interface. When the associated information required by the selected cellular network's MNO is collected from the input unit, the input of the associated information may be provided by an administrator or a user of MSA management server 216.

In process 808, processing unit 101 of MSA 100 selects at least one available eUICC from a plurality of eUICCs and retrieves eUICC ID information from the selected at least one eUICC. The plurality of eUICCs may be placed in MSA 100 or in an external device connected to MSA 100. The at least one eUICC is selected to store the at least one eSIM profile that is to be downloaded from the selected at least one cellular network. In process 809, processing unit 101 of MSA 100 sends the eUICC ID information of the selected at least one eUICC to MSA management server 216. In process 810, MSA management server 216 sends a response to the request received in process 806 from network device 150. The response comprises the eUICC ID information received from MSA 100 and the other associated information that is retrieved from a storage unit or collected through an input unit. In another variant, when the associated information is not required, MSA management server 216 forwards the eUICC ID information received from MSA 100 to network device 150 in step 810.

In process 811, processing unit 155 of network device 150 forwards the eUICC ID information along with the associated information to the MNO of the selected cellular network. Upon receiving the eUICC ID information and associated information, the MNO of the selected cellular network may perform verification procedures. When the information is found as valid, the MNO of the selected cellular network, in process 812, may provide at least one eSIM profile to network device 150 through an eSIM subscription management server (SM-DP+). It should be noted that, before providing the at least one eSIM profile, several internal processes may be performed at the MNO for preparing the at least one eSIM profile which are not elaborated in this disclosure in order to avoid obscuring the description. For example, the eUICC ID information and the other associated information may be received at the Business Support System (BSS) of the MNO through an online portal provided by the MNO or from a terminal responsible for collecting subscriber information. Then, the BSS of the MNO may perform a verification of the received information in a verification server. When the information is found valid, the BSS may send a request to an eSIM subscription management server (SM-DP+) for preparing and providing at least one eSIM profile to network device 150.

Alternatively, in M2M eSIM profile provisioning, the BSS may request a subscription management data preparation (SM-DP) server of the MNO to prepare at least one eSIM profile based on the information. After preparing the at least one eSIM profile, the SM-DP may send the at least one eSIM profile to a subscription management secure routing (SM-SR) server of the MNO for securely providing the at least one eSIM profile to the network device or to the at least one eUICC.

However, when the information is found invalid, the MNO of the selected cellular network may notify this invalidity event to the network device 150. Network device 150 may notify the user of the invalidity event by displaying a message on a display or by sending an invalidity notification message to MSA management server 216. However, for illustration purposes, it is supposed that the eUICC ID information and the associated information is found valid.

In process 813, network device 150 forwards the at least one eSIM profile information received from the MNO of the selected cellular network to MSA management server 216. After that, in process 814, MSA management server 216 forwards the at least one eSIM profile to MSA 100. In another variant, network device 150 directly sends the at least one eSIM profile to MSA 100 in step 813 and step 814 is omitted.

In process 815, the at least one eSIM profile is installed onto the at least one eUICC corresponding to the eUICC ID. After successfully completing the method illustrated in FIG. 8A, the at least one eSIM profile becomes ready to be used by network device 150 or other network devices for establishing a cellular network connection.

FIG. 8B is a process flow diagram illustrating a method for downloading one or more eSIM profiles in an MSA according to one exemplary embodiment of the present invention. For illustration purposes, the eSIM profiles are to be stored in at least one eUICC placed in MSA 100 shown in FIG. 1A. In process 821, a request for downloading at least one eSIM profile is received at MSA 100. The request is sent by an MSA management server, such as MSA management server 216 shown in FIG. 1D. Before process 821, MSA 100 and MSA management server 216 should be connected over interconnected networks, such as interconnected networks 217. There is no limitation on the number of MSAs that may be connected with MSA management server 216.

MSA management server 216 may send the request for eSIM profile downloading when one or more of the following events occurs: an instruction is received from an administrator or user of MSA management server 216 to download eSIM profile(s), a request is received to download eSIM profile(s) from a network device connected to MSA management server 216, failing to find at least one eSIM profile while searching at least one eSIM profile in the eSIM profiles lookup table, and a change in the location of a network device is detected. In order to detect changes in the location of a network device, MSA management server 216 may periodically inspect the location of the one or more network devices connected to it. In one variant, MSA 100 receives the request for downloading eSIM profiles directly from a user or administrator and not through an MSA management server.

In process 822, processing unit 101 of MSA 100 selects an eUICC from MSA 100 and retrieves eUICC ID information of the selected eUICC. In process 823, MSA 100 sends a request for eSIM profile downloading to a network device, such as network device 150. In order to receive the request from MSA 100, network device 150 should be connected with MSA 100 prior to process 823. Network device 150 may be connected to MSA 100 over interconnected networks 217. The request sent in process 823 may comprise the retrieved eUICC ID information. In another variant, the request sent in process 823 may also comprise other associated information that may be required by an MNO to provide an eSIM profile. In that case, the associated information may be stored in a storage unit connected to MSA 100.

In another variant, the associated information is collected from an input unit when requested by an MNO. For example, network device 150 may comprise an input unit to allow an administrator or a user to communicate information and commands to the processing unit of network device 150. The input unit may be a touch sensitive screen or a keypad mounted on network device 150. The user or the administrator of network device 150 may input data to network device 150 through the touch sensitive screen or the keypad. In one variant, the input unit may also be indirectly connected to network device 150 through an external device that is connected to network device 150. The external device may be a desktop computer, a laptop computer, a mobile phone, a smartphone, a personal digital assistant (PDA), or any other electronic device that is capable of connecting to a network interface.

After receiving the request for downloading at least one eSIM profile, network device 150 identifies available cellular networks in its current geographical area. Network device 150 may identify the available cellular networks by scanning radio signals using an available WCM placed in network device 150. The WCM may be a profile download capable or a profile download incapable WCM.

In process 825, network device 150 sends a request for an eSIM profile to the MNO(s) of the identified cellular networks. When one cellular network is identified in process 824, one request is sent in process 825 to the respective MNO of the identified cellular network. When a plurality of cellular networks is identified in process 824, a request is sent to the respective MNO of each of the plurality of identified cellular networks. For illustration purposes, in this exemplary embodiment, a plurality of cellular networks has already been identified in process 824. Thus, in process 825, the request is sent to the respective MNOs of each of the plurality of identified cellular networks. The request sent in process 825 may comprise the eUICC ID information sent by MSA 100.

However, when no cellular network is identified in process 824, network device 150 may notify MSA 100 that no cellular network is available and stop the method of downloading eSIM profile. In another variant, network device 150 may notify MSA management server 216 that no cellular network is available and stop the method of downloading eSIM profile. After receiving the notification of the unavailability of a cellular network, MSA 100 or MSA management server 216 may also stop the method of downloading eSIM profile or await further instructions from a user or administrator. In another variant, network device 150 may notify a user or administrator of network device 150 that no cellular network is available through a message on a display and awaits further instructions or turns on a standby mode.

Upon receiving the eUICC ID information or the eUICC ID and the associated information, the MNOs of the identified cellular networks may perform a verification. When the information is valid, in process 826, the MNO of each of the identified cellular networks may provide an eSIM profile to network device 150 through an eSIM subscription management server (SM-DP+). It should be noted that, before providing the at least one eSIM profile, several internal processes which are not elaborated in this disclosure in order to avoid obscuring the description, may be performed at the MNO for preparing the at least one eSIM profile. When the information is found invalid, the MNO of the identified cellular networks may notify network device 150 of this invalidity event. Network device 150 may notify the user or the administrator of the invalidity event by displaying a message on a display or by sending an invalidity notification message to MSA management server 216. However, for illustration purposes, it is supposed that the eUICC ID information and the associated information is found valid.

In process 827, network device 150 forwards the eSIM profiles information received from the MNOs of the identified cellular networks to MSA 100. In process 828, the eSIM profiles are installed on the selected eUICC corresponding to the eUICC ID. After the successful completion of the method illustrated in FIG. 8B, the eSIM profiles become ready to be used by network device 150 or other network devices.

FIG. 9 illustrates an exemplary eSIM profile lookup table 900 according to one exemplary embodiment of the present invention. It should be noted that the design and structure of the eSIM profile lookup table shown here is for illustration purposes only. In actual implementation, an eSIM profile lookup table may be a combination of a group of tables, cells, or information fields. In one variant, the eSIM profile lookup table may be realized using a relational or a non-relational database structure, such as a sequential query language (SQL) database structure or NoSQL database structure. The eSIM profile lookup table may be stored in a storage unit connected to an MSA, such as MSA 100. For illustration purposes, eSIM profile lookup table 900 may be stored in storage unit 105 of MSA 100 shown in FIG. 1A.

The eSIM profile lookup table may record the information of all eSIM profiles stored in one or more eUICCs placed in or connected to MSA 100. For illustration purposes, eSIM profile lookup table 900 may record information, such as MNO ID, ICCID, and eUICC ID, corresponding to each eSIM profile. The eSIM profile lookup table may also record a status field to show the current status of an eSIM profile, whether it is in use or available to be used. An MNO ID is used to identify an MNO of an eSIM profile. An ICCID is used to identify an eSIM profile. An eUICC ID is used to identify an eUICC that is storing the eSIM profile.

For illustration purposes, in FIG. 9, MNO IDs, such as "001", "002", and "003" are shown to represent three different MNO, wherein ICCIDs, such as "aaa", "bbb", "ccc", "ppp", "qqq", and "sss" are shown to represent six different eSIM profiles, and eUICC IDs, such as "111111", "222222", and "333333" are shown to represent three different eUICCs. It should be noted that the numbers and alphabets shown as MNO IDs, ICCIDs, and eUICC IDs are only for exemplary purposes, in actual implementation, an MNO ID may be of 5-6 digits, an ICCID may be of 19-22 digits, and an eUICC ID may be of up to 32 digits.

According to one exemplary embodiment of the present invention, when a request for at least one eSIM profile of at least one MNO is received at MSA 100 from a network device, MSA 100 reads eSIM profile lookup table 900 to determine whether an eSIM profile is available of the at least one MNO. When at least one eSIM profile is available, MSA 100 sends the information of the at least one available eSIM profile of the at least one MNO to the network device. The network device may then use the eSIM profile information to establish at least one cellular network connection over the cellular network of the at least one MNO. The procedures for performing eSIM profile lookup will be discussed in more detail under FIG. 11.

Figure 10:
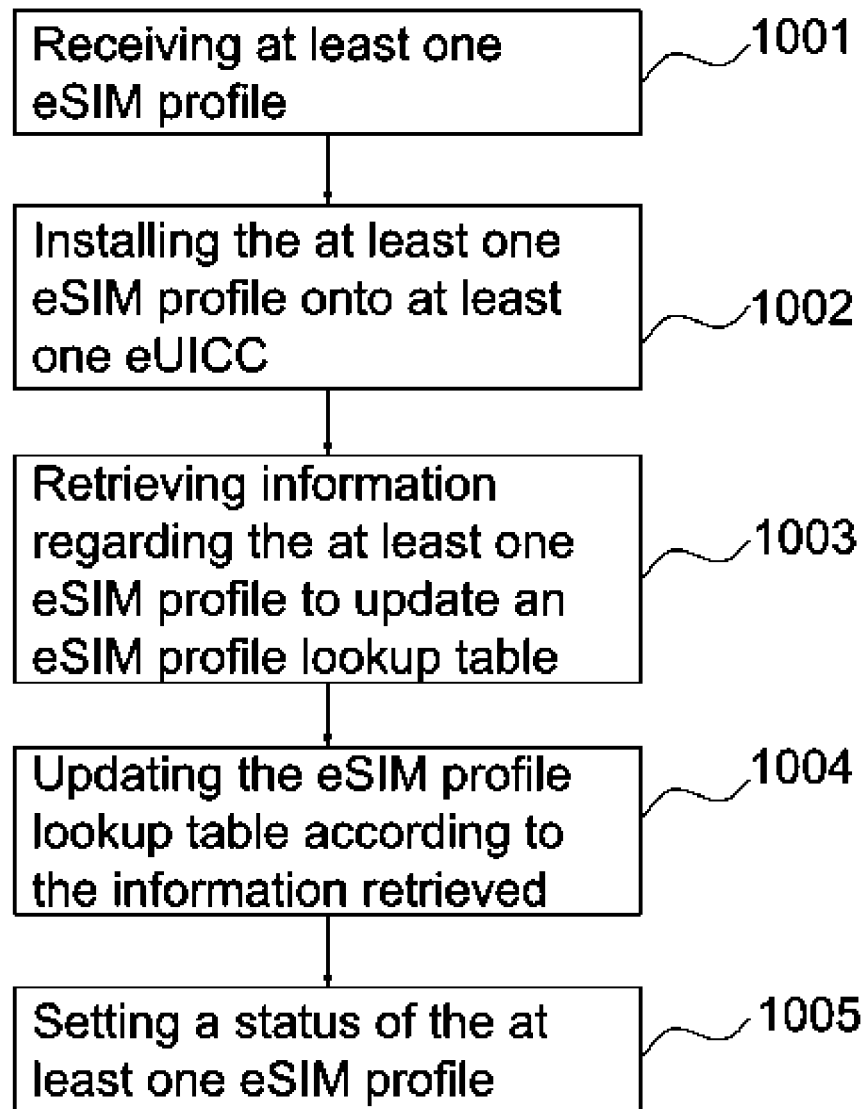
FIG. 10 is a process flow diagram illustrating a method for updating an exemplary eSIM profile lookup table according to one exemplary embodiment of the present invention.

FIG. 10 is a process flow diagram illustrating a method for updating an exemplary eSIM profile lookup table 900 according to one exemplary embodiment of the present invention. The processes disclosed in FIG. 10 may be performed by a processing unit of an MSA, such as MSA 100. In one variant, the processes of FIG. 10 may also be performed by a processing unit of an MSA management server or a network device.

In process 1001, MSA 100 receives at least one eSIM profile from at least one MNO. The at least one eSIM profile may be received directly from the at least one MNO, or through a network device or an MSA management server. MSA 100 may receive the at least one eSIM profile as a result of the processes discussed in FIG. 3, 7, 8A, or 8B.

In process 1002, the received at least one eSIM profile is installed in at least one eUICC. The at least one eUICC in which the at least one eSIM profile is installed may be selected from a plurality of eUICCs to install the at least one eSIM profile prior to receiving the at least one eSIM profile or after receiving the at least one eSIM profile. The plurality of eUICCs may be placed in or connected to MSA 100.

In process 1003, information is retrieved regarding the at least one eSIM profile received from the at least one eUICC in which the at least one eSIM profile is installed. The information that is retrieved may include, at least one MNO ID, at least one ICCID, and at least one eUICC ID of the at least one eUICC in which the at least one eSIM profile is installed.

In process 1004, eSIM profile lookup table 900 is updated according to the information retrieved. For example, information that is updated regarding the installed at least one eSIM profile may include at least one MNO ID of at least one MNO from which the at least one eSIM profile is received, at least one ICCID comprised in the at least one eSIM profile for identifying the at least one eSIM profile uniquely, and at least one eUICC ID of the at least one eUICC in which the at least one eSIM profile is installed.

In process 1005, a status is set for the at least one eSIM profile based on its availability. Processes disclosed in FIG. 10 are followed for each eSIM profile received by MSA 100. The status of each eSIM profile installed could be set to indicate the availability of the eSIM profile. For example, when an eSIM profile is not being used, the status is set as "Available", and when an eSIM profile is being used, the status is set as "In use". Generally, for an eSIM profile that is just installed, the status should be set as "Available".

Figure 11:
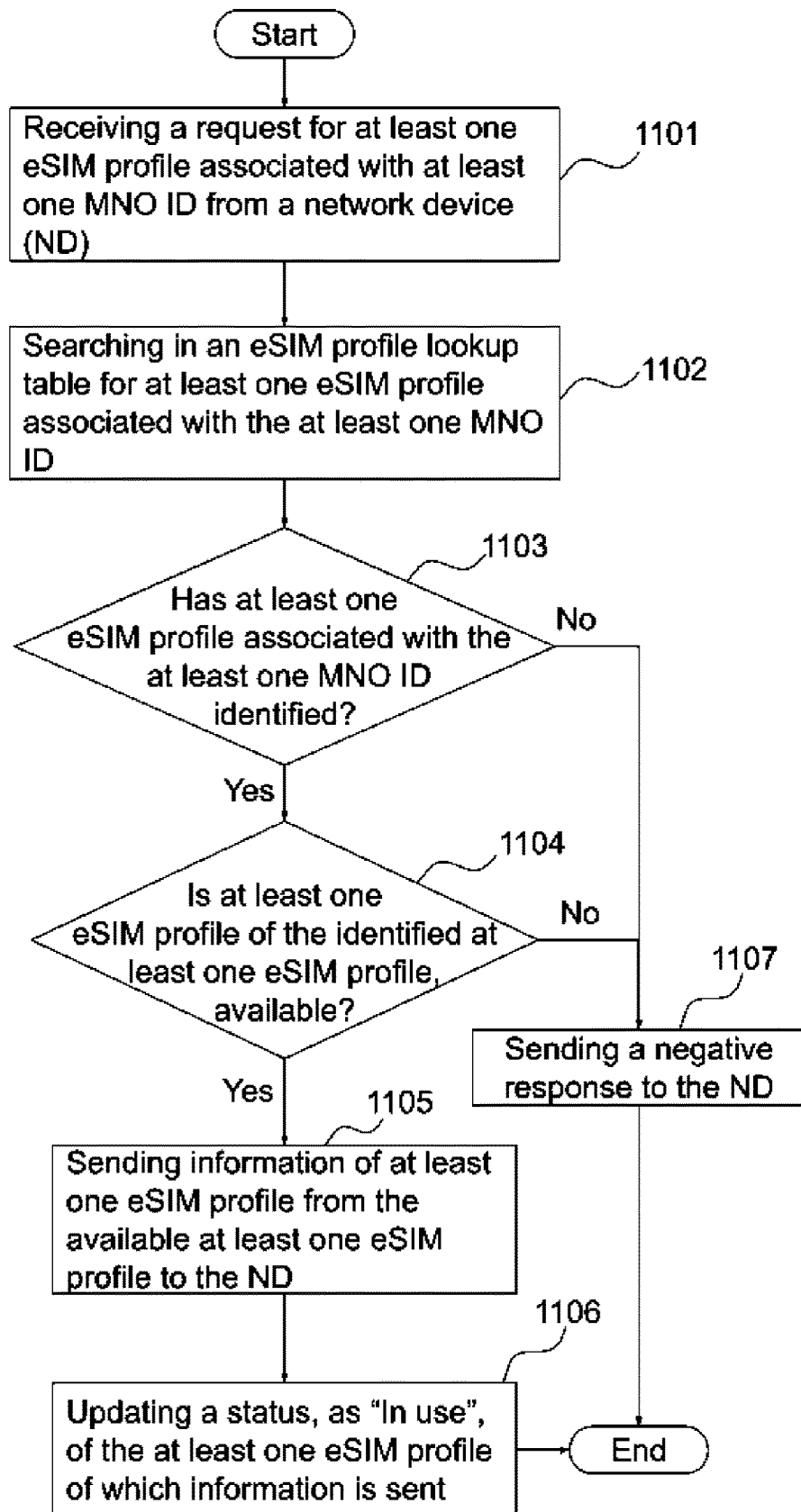
FIG. 11 is a process flow diagram illustrating a method for performing eSIM profile lookup in an eSIM profile lookup table according to one exemplary embodiment of the present invention.

FIG. 11 is a process flow diagram illustrating a method for performing eSIM profile lookup in an eSIM profile lookup table according to one exemplary embodiment of the present invention. For illustration purposes, the eSIM profile lookup is performed in eSIM profile lookup table 900. The processes disclosed in FIG. 11 may be performed by a processing unit of an MSA, such as processing unit 101 of MSA 100. For example, eSIM profile lookup table 900 is stored in a storage unit of MSA 100, such as storage unit 105. In one variant, the processes of FIG. 11 may also be performed by a processing unit of an MSA management server or by a processing unit of a network device.

The method starts in process 1101 when a request for at least one eSIM profile of at least one MNO is received at MSA 100 from a network device, such as network device 150. The request may comprise at least one MNO ID to specify the at least one MNO for which the at least one eSIM profile is requested.

In process 1102, processing unit 101 of MSA 100 reads eSIM profile lookup table 900 to identify at least one eSIM profile associated with the at least one MNO ID. In process 1103, processing unit 101 of MSA 100 determines whether at least one eSIM profile associated with the at least one MNO ID is identified. When at least one eSIM profile is identified, processing unit 101 of MSA 100, in process 1104, determines whether at least one eSIM profile of the identified at least one eSIM profile is available or not.

When at least one eSIM profile associated with the at least one MNO ID is not identified in process 1103, process 1107 is performed. In process 1107, a negative response is sent to network device 150. Process 1107 is also performed when at least one eSIM profile of the identified at least one eSIM profile is not determined as available in process 1104. The negative response is sent to inform network device 150 that no eSIM profile of the at least one MNO is stored or available in MSA 100. After sending the negative response, the method may be stopped or initiatives to download at least one eSIM profile of the at least one MNO may be started as discussed under FIGS. 7, 8A, and 8B. In one variant, processes 1103 and 1104 may be performed concurrently. In another variant, process 1103 may be omitted, and only process 1104 may be performed to determine whether at least one eSIM profile associated with the at least one MNO ID is available.

When at least one eSIM profile of the identified at least one eSIM profile is determined as available in process 1104, process 1105 is performed. In process 1105, information regarding at least one eSIM profile from the available at least one eSIM profile is sent to network device 150. The information sent may include at least one IMSI of the at least one eSIM profile, at least one eUICC ID on which the at least one eSIM profile is stored, and other associated information that may be required by the cellular network of the at least one MNO. In one variant, the information is sent based on specific information requests from network device 150, wherein the specific information requests may be originally received at network device 150 from the at least one MNO.

In process 1106, a status related to the at least one eSIM profile of which information is sent to network device 150 is changed from "Available" to "In use". The status of the at least one eSIM profile may be changed back to "Available" after receiving a notification from network device 150. The notification may be to inform MSA 100 that network device 150 is not using the at least one eSIM profile. In one variant, the notification may be sent to inform MSA 100 that network device 150 no longer needs to use the at least one eSIM profile. In another variant, the status of the at least one eSIM profile may be changed back to "Available" when MSA 100 identifies that the eSIM profile has not been used by network 150 for a particular period of time.

The notification may be sent by network device 150 when at least one cellular network connection, established using the at least one eSIM profile, is not being used for data communication for a particular period of time, or when an administrator or user of network device 150 manually disconnects at least one cellular network connection established using the at least one eSIM profile. There is no limitation on the events which may trigger network device 150 to send the notification. Similarly, there is no limitation on the times when network device 150 may send the notification.

The embodiments were chosen and described in order to best explain the principles of the invention and its practical applications, and thereby, enable others skilled in the art to best utilize the invention and the various embodiments with various modifications as are suited to the particular use contemplated.

The invention claimed is:

1. A method for establishing data communication at a network device, the method comprising:
   (a) identifying a plurality of available cellular networks by scanning signals of a plurality of cellular networks using a wireless communication module (WCM) of the network device;
   (b) selecting, based on a signal strength level threshold, at least one cellular network from the plurality of available cellular networks;
   (c) sending a first request for at least one embedded subscriber identification module (eSIM) profile of the at least one cellular network with identity information of the at least one cellular network to a massive subscriber identification module (SIM) apparatus;
   (d) when the first request is received with the identity information by the massive SIM apparatus (MSA) and the at least one eSIM profile is available at the MSA:
      (i) receiving at least part of information of the at least one eSIM profile from the MSA;
      (ii) sending a second request for data communication access to the at least one cellular network using the at least part of information of the at least one eSIM profile;
      (iii) obtaining the data communication access from the at least one cellular network to establish the data communication over the at least one cellular network;
   (e) when the first request is received with the identity information by the MSA and none of the at least one eSIM profile is available at the MSA:
      (i) receiving a negative response from the MSA;
      (ii) requesting an eSIM profile from the cellular network and in response, receiving at least one eUICC ID from the cellular network;
      (iii) forwarding the received at least one eUICC ID to the MSA and in response, receiving eUICC ID information from the MSA;
      (iv) in response to forwarding the eUICC ID information to the cellular network, downloading the at least one eSIM profile from the at least one cellular network;
      (v) establishing the data communication over the at least one cellular network by using the at least one eSIM profile; and
   (f) after step (d) (ii) and after step (e) (iv):
      (i) receiving an authentication request from the at least one cellular network;
      (ii) forwarding the authentication request to the MSA;
      (iii) receiving authentication information from the MSA in response to the authentication request; wherein the authentication information is provided to the MSA by at least one second Embedded Universal Integrated Circuit Card (eUICC) storing the at least one eSIM profile; wherein the at least one second eUICC is housed in the MSA; and
      (iv) forwarding the authentication information to the at least one cellular network.

2. The method of claim 1, wherein the at least part of information of the at least one eSIM profile received at step (d) (i) comprises at least one international mobile subscriber identity (IMSI) number.

3. The method of claim 1, wherein the at least one cellular network is selected at step (b) when a signal strength of the at least one cellular network meets the signal strength level threshold.

4. The method of claim 1, wherein the identity information comprises a Public Land Mobile Network (PLMN) ID of the at least one cellular network.

5. The method of claim 1, wherein the plurality of available cellular networks are available in a location of the network device.

6. The method of claim 1, wherein the MSA comprises an eSIM profile lookup table.

7. The method of claim 6, wherein the at least one eSIM profile is determined to be available at the MSA by running an eSIM profile lookup in the eSIM profile lookup table.

8. The method of claim 7, wherein the eSIM profile lookup table comprises identity(ies) of the at least one eSIM profile stored in the at least one second eUICC.

9. The method of claim 1, wherein:
   the plurality of available cellular networks are available in a location of the network device;
   the at least one cellular network is selected at step (b) when a signal strength of the at least one cellular network meets the signal strength level threshold;
   the identity information comprises a Public Land Mobile Network (PLMN) ID of the at least one cellular network;
   the MSA comprises an eSIM profile lookup table;
   the eSIM profile lookup table comprises identity (ies) of the at least one eSIM profiles stored in the at least one second eUICCs; and
   the at least one eSIM profile is determined to be available at the MSA by running an eSIM profile lookup in the eSIM profile lookup table.

10. A network device, comprising:
   at least one processing unit;
   a plurality of wireless communication modules (WCMs);
   at least one subscriber identification module (SIM) interface; and
   at least one non-transitory computer-readable storage medium storing program instructions executable by the at least one processing unit for:
      (a) identifying a plurality of available cellular networks by scanning signals of a plurality of cellular networks using a WCM in the plurality of WCMs of the network device;
      (b) selecting, based on a signal strength level threshold, at least one cellular network from the plurality of available cellular networks;
      (c) sending a first request for at least one embedded subscriber identification module (eSIM) profile of the at least one cellular network with identity information of the at least one cellular network to a massive SIM apparatus (MSA);
      (d) when the first request is received with the identity information by the MSA and the at least one eSIM profile is available at the MSA:
         (i) receiving at least part of information of the at least one eSIM profile from the MSA;
         (ii) sending a second request for data communication access to the at least one cellular network using the at least part of information of the at least one eSIM profile;
         (iii) obtaining the data communication access from the at least one cellular network to establish the data communication over the at least one cellular network; and (e) when the first request is received with the identity information by the MSA and none of the at least one eSIM profile is available at the MSA:
  (i) receiving a negative response from the MSA;
  (ii) requesting an eSIM profile from the cellular network and in response, receiving at least one eUICC ID from the cellular network;
  (iii) forwarding the received at least one eUICC ID to the MSA and in response, receiving eUICC ID information from the MSA;
  (iv) in response to forwarding the eUICC ID information to the cellular network, downloading the at least one eSIM profile from the at least one cellular network; and
  (v) establishing the data communication over the at least one cellular (v) network by using the at least one eSIM profile
(f) after step (d) (ii) and after step (e) (iv):
  (i) receiving an authentication request from the at least one cellular network;
  (ii) forwarding the authentication request to the MSA;
  (iii) receiving authentication information from the MSA in response to the authentication request; wherein the authentication information is provided to the MSA by at least one second Embedded Universal Integrated Circuit Card (eUICC) storing the at least one eSIM profile; wherein the at least one second eUICC is housed in the MSA; and
  (iv) forwarding the authentication information to the at least one cellular network.

11. The network device according to claim 10, wherein the at least part of information of the at least one eSIM profile received at step (d) (i) comprises at least one international mobile subscriber identity (IMSI) number.

12. The network device according to claim 10, wherein the at least one cellular network is selected at step (b) when a signal strength of the at least one cellular network meets the signal strength level threshold.

13. The network device according to claim 10, wherein the identity information comprises a Public Land Mobile Network (PLMN) ID of the at least one cellular network.

14. The network device according to claim 10, wherein the plurality of available cellular networks are available in a location of the network device.

15. The network device according to claim 10, wherein the MSA comprises an eSIM profile lookup table.

16. The network device according to claim 15, wherein at least one eSIM profile is determined to be available at the MSA by running an eSIM profile lookup in the eSIM profile lookup table.

17. The network device according to claim 16, wherein the eSIM profile lookup table comprises identity (ies) of the at least one eSIM profiles stored in the at least one second eUICC.

* * * * *